US008843716B2

(12) United States Patent
Suzuki et al.

(10) Patent No.: US 8,843,716 B2
(45) Date of Patent: Sep. 23, 2014

(54) COMPUTER SYSTEM, STORAGE APPARATUS AND DATA TRANSFER METHOD

(75) Inventors: Katsunori Suzuki, Yokohama (JP); Hiroshi Nasu, Yokohama (JP); Daisuke Shinohara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 222 days.

(21) Appl. No.: 13/508,248

(22) PCT Filed: Apr. 24, 2012

(86) PCT No.: PCT/JP2012/002800
§ 371 (c)(1),
(2), (4) Date: May 4, 2012

(87) PCT Pub. No.: WO2013/160935
PCT Pub. Date: Oct. 31, 2013

(65) Prior Publication Data
US 2013/0282997 A1    Oct. 24, 2013

(51) Int. Cl.
*G06F 12/02* (2006.01)
*G06F 11/14* (2006.01)
(52) U.S. Cl.
CPC .................................. *G06F 11/1448* (2013.01)
USPC ........................................................ 711/162
(58) Field of Classification Search
CPC ............................. G06F 11/1448; G06F 3/067
See application file for complete search history.

(56) References Cited

U.S. PATENT DOCUMENTS

| 7,139,810 | B2 * | 11/2006 | Ido et al. .................. 709/216 |
| 2001/0047461 | A1 | 11/2001 | Milillo et al. |
| 2004/0024961 | A1 | 2/2004 | Cochran et al. |
| 2008/0120459 | A1 * | 5/2008 | Kaneda et al. ............. 711/112 |
| 2010/0306498 | A1 | 12/2010 | Shiga |
| 2011/0173401 | A1 | 7/2011 | Usgaonkar et al. |
| 2012/0060154 | A1 * | 3/2012 | Higuchi et al. ............... 718/1 |

FOREIGN PATENT DOCUMENTS

JP    2012-504795 A    2/2012

OTHER PUBLICATIONS

PCT International Search Report and Written Opinion on application PCT/JP2012/002800 mailed Oct. 24, 2012; 12 pages.

* cited by examiner

*Primary Examiner* — Hiep Nguyen
(74) *Attorney, Agent, or Firm* — Foley & Lardner LLP

(57) ABSTRACT

Speed of processing of transferring data stored in a storage apparatus to an external apparatus is increased.

A storage apparatus according to the present invention: creates a non-decompression volume set to refer to a compression pool that compresses and stores data; decompresses and provides the data stored in the compression pool to a host computer; and provides the compressed data as is to other external apparatuses via the non-decompression volume.

7 Claims, 25 Drawing Sheets

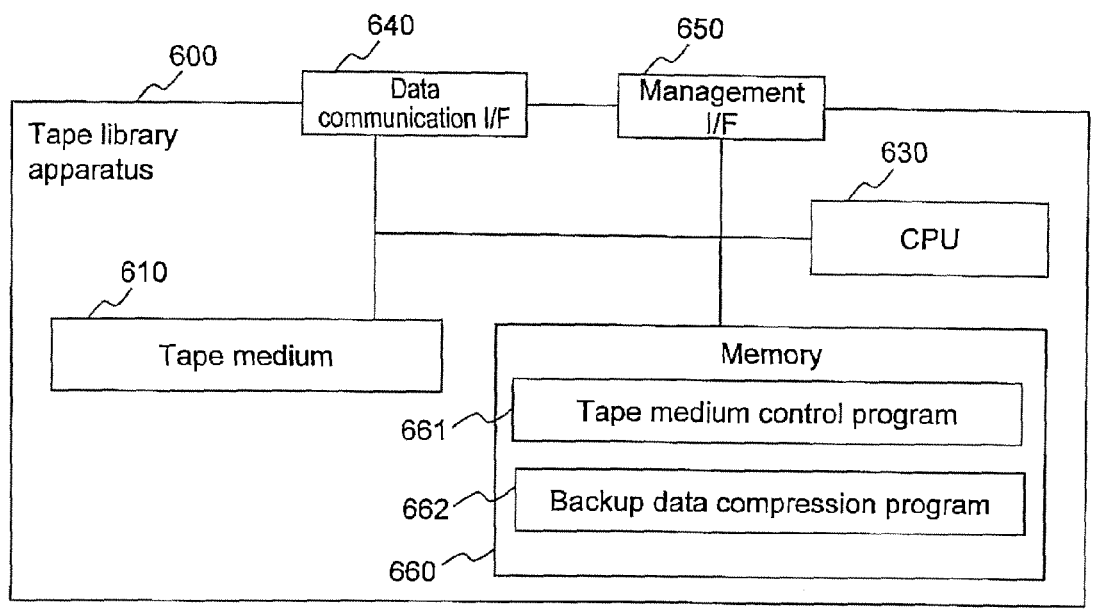

Fig. 9

| Compression data ID | Pool LBA range | |
| --- | --- | --- |
| | Start | End |
| 1001 | 1 | 20 |
| 1002 | 31 | 45 |

Fig. 10

| Non-decompression volume ID | Pool ID | Compression data ID | Non-decompression volume LBA range | |
| --- | --- | --- | --- | --- |
| | | | Start | End |
| 101 | 1 | 1001 | 1 | 20 |
| | | 1002 | 21 | 35 |

Fig. 11

| Volume ID | Volume type |
| --- | --- |
| 1 | External |
| 2 | Decompression |
| 101 | Non-decompression |

Fig. 12

| Storage apparatus ID (4641) | Volume ID (4642) | External volume flag (4643) | External storage apparatus ID (4644) | External volume ID (4645) | Decompression volume flag (4646) | Non-decompression volume flag (4647) | Non-decompression volume ID (4648) |
|---|---|---|---|---|---|---|---|
| 1 | 1 | True | 2 | 1 | NULL | NULL | NULL |
|   | 2 | False | NULL | NULL | True | True | 101 |
|   | 3 | False | NULL | NULL | True | False | NULL |
|   | 4 | False | NULL | NULL | False | NULL | NULL |

| Storage apparatus ID (4651) | Non-decompression volume ID (4652) | Compression pool ID (4653) | Non-decompression volume LBA range (4654) | | Compression data ID (4655) | Decompression volume LBA (4656) |
|---|---|---|---|---|---|---|
| | | | Start | End | | |
| 1 | 101 | 1 | 1 | 20 | 1001 | 001 |
|   |   |   | 21 | 35 | 1002 | 002 |

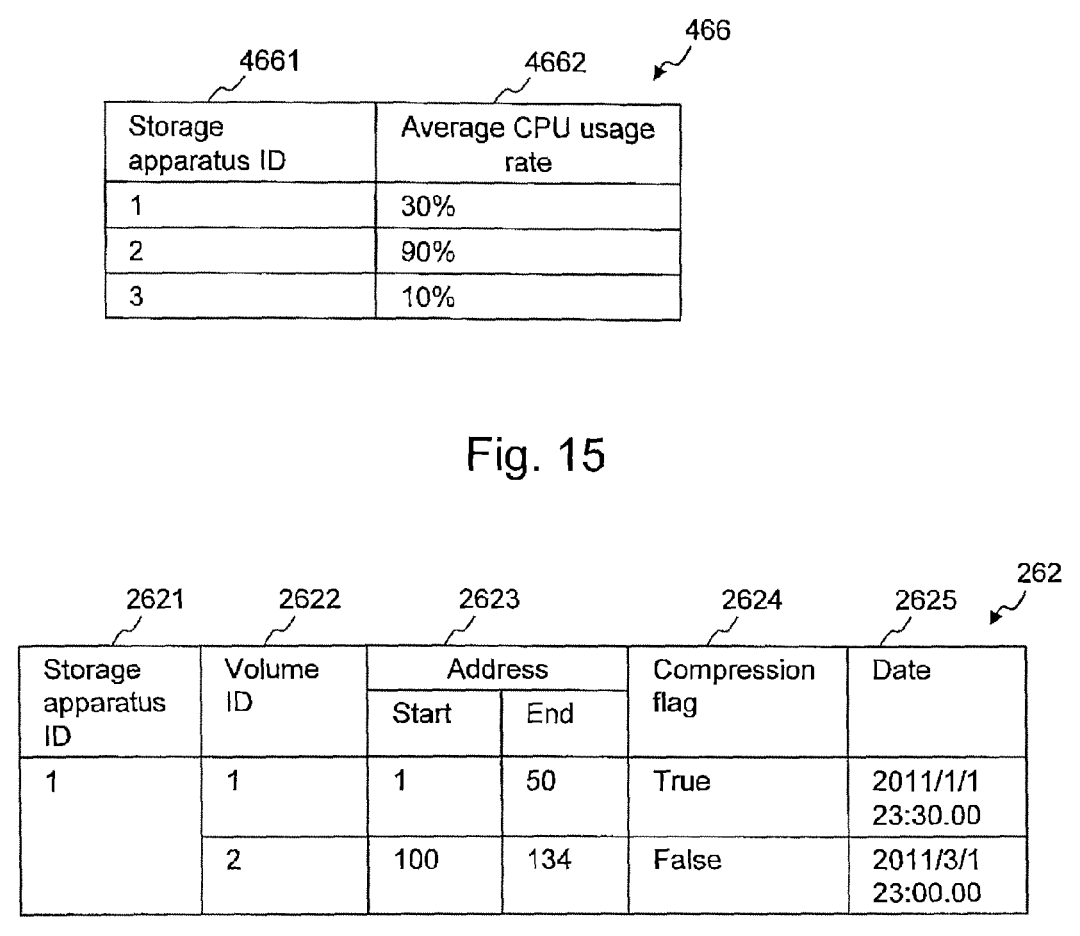

| Storage apparatus ID | Average CPU usage rate |
|---|---|
| 1 | 30% |
| 2 | 90% |
| 3 | 10% |

Fig. 15

| Storage apparatus ID | Volume ID | Address | | Compression flag | Date |
| | | Start | End | | |
|---|---|---|---|---|---|
| 1 | 1 | 1 | 50 | True | 2011/1/1 23:30.00 |
| | 2 | 100 | 134 | False | 2011/3/1 23:00.00 |

Fig. 24

| External volume ID | External storage ID | Volume ID | External volume LBA | Volume LBA |
|---|---|---|---|---|
| 1 | 2 | 1 | 001 | 101 |
| | | | 002 | 102 |
| | | | 003 | 103 |

COMPUTER SYSTEM, STORAGE APPARATUS AND DATA TRANSFER METHOD

TECHNICAL FIELD

The present invention relates to a technique for transferring data between a storage apparatus and an external apparatus.

BACKGROUND ART

In an environment in which tape backup is performed for a large volume of data at regular intervals, it is necessary to speed up backup processing to complete the backup processing within a determined backup time. In this case, it is assumed that the backup is implemented using a plurality of tape backup apparatuses and backup servers in parallel. This method requires a plurality of tape apparatuses and backup servers, and therefore their provision cost is a problem to be solved.

As a method for speeding up backup processing, data compression is possible. PTL 1 below discloses a method for compressing data in a storage apparatus as an example of a technique for compressing the data capacity.

CITATION LIST

Patent Literature

PTL 1: JP Patent Publication (Kohyo) No. 2012-504795

SUMMARY OF INVENTION

Technical Problem

Since the technique disclosed in above PTL 1 is a technique for compressing and memorizing data while the data is stored in a storage apparatus, when the data is provided to an external apparatus such as a host computer, it is necessary to decompress the compressed data.

In the technique disclosed in PTL 1, to back up the data stored in the storage apparatus, it is also considered that the compressed data is decompressed and then transferred to a backup apparatus. Therefore, it is difficult by the data compression technique disclosed in PTL 1 to speed up backup processing.

In view of the above problem, it is an object of the present invention to speed up processing of transferring data stored in a storage apparatus to an external apparatus.

Solution to Problem

A storage apparatus according to the present invention: creates a non-decompression volume set to refer to a compression pool that compresses and stores data; decompresses and provides the data stored in the compression pool to a host computer; and provides the compressed data as is to other external apparatuses via the non-decompression volume.

Advantageous Effects of Invention

According to a storage apparatus of the present invention, it is possible to speed up transfer processing by transferring data while reducing the data capacity of data to be provided to a host computer by compression and compressing data to be transferred to other external apparatuses.

BRIEF DESCRIPTION OF DRAWINGS

FIG. 7 is a block diagram for illustrating an internal configuration of a tape library apparatus 600.

FIG. 8 is a diagram showing a configuration of a decompression volume management table 164.

FIG. 9 is a diagram showing a configuration of a compression data arrangement management table 166.

FIG. 10 is a diagram showing a configuration of a non-decompression volume management table 165.

FIG. 11 is a diagram showing a configuration of a volume type management table 167.

FIG. 12 is a diagram showing a configuration of a backup volume management table 464.

FIG. 13 is a diagram showing a configuration of a decompression volume mapping management table 465.

FIG. 14 is a diagram showing a configuration of a CPU usage rate table 466.

FIG. 15 is a diagram showing a configuration of a tape backup data management table 262.

FIG. 24 is a diagram showing a configuration of an external volume mapping management table 169.

DESCRIPTION OF EMBODIMENTS

Example 1

System Configuration

Figure 1:
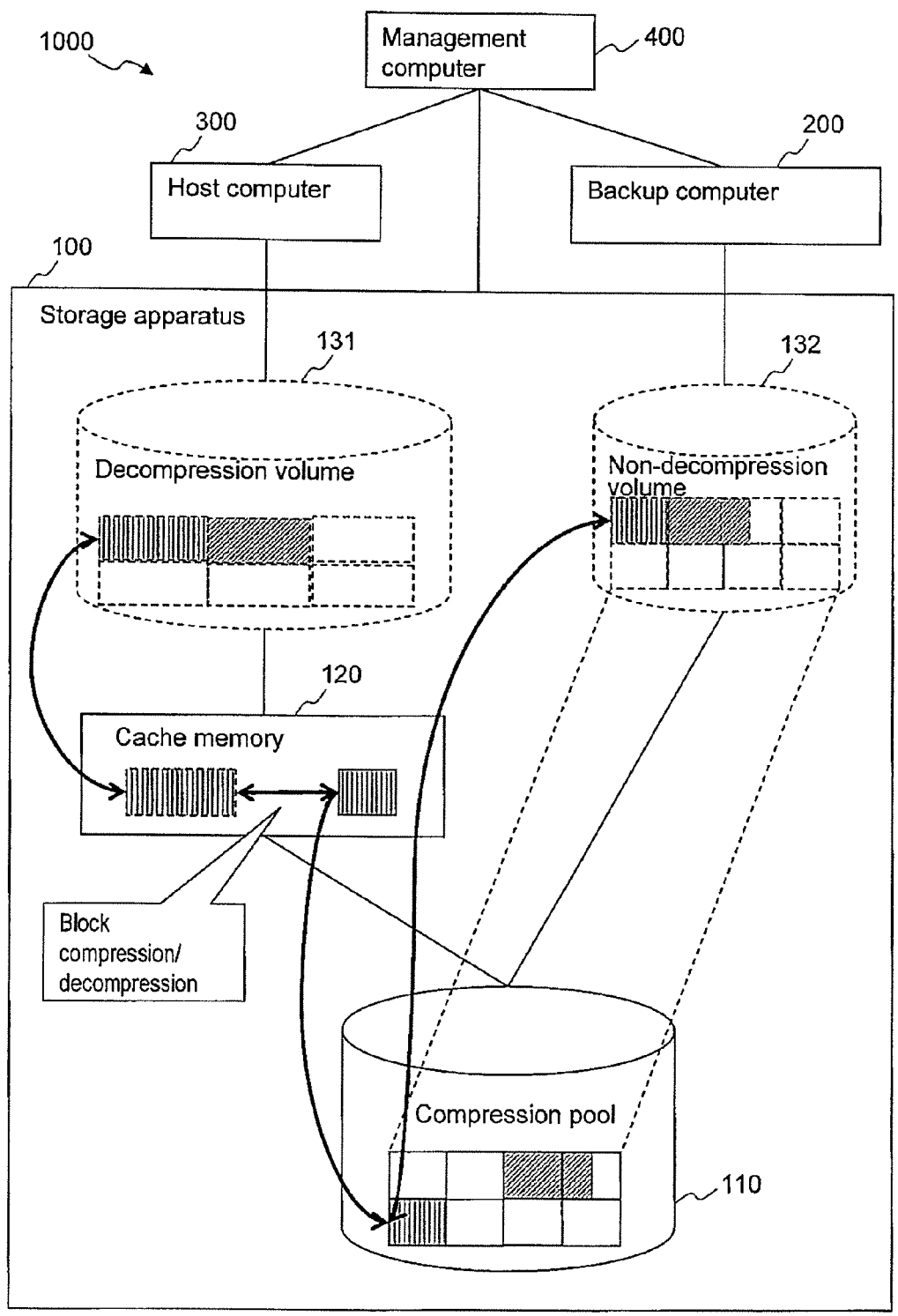
FIG. 1 is a configuration diagram of a computer system 1000 according to Example 1.

FIG. 1 is a configuration diagram of the computer system 1000 according to Embodiment 1 of the present invention. The computer system 1000 has the storage apparatus 100, the backup computer 200, the host computer 300 and the management computer 400.

The storage apparatus 100 is an apparatus that stores data to be provided to the host computer 300, and has a compression pool 110 and a cache memory 120. Further, as logical memory areas, a decompression volume 131 and the non-decompression volume 132 are created and provided to the host computer 300 and the backup computer 200, respectively. Other components will be described later.

The compression pool 110 is a memory area to compress and store data, and is configured with at least one physical disk apparatus. The cache memory 120 is a memory to decompress and temporarily hold the data stored in the compression pool 110.

The decompression volume 131 and the non-decompression volume 132 actually are virtual memory areas set to refer to a memory area in a physical disk.

The host computer 300 recognizes the decompression volume 131 as a memory area to store uncompressed data. In other word, a memory area for a data capacity of uncompressed data is secured on the decompression volume. However, the substance is compressed and stored in the compression pool 110 in the storage apparatus 1, and therefore it is referred to as a "compression" volume.

In the present application, the non-decompression volume 132 is a virtual volume that is set to be read out without decompressing compressed stored data for specific purposes. Specifically, it is provided to the backup apparatus 200 for the purpose of backup/restoration only.

The backup computer 200 is an apparatus that backs up data stored in the storage apparatus 100. The backup computer 200 can access compressed data itself stored in the compression pool 110 via the non-decompression volume 132 provided for backup/restoration processing, instead of the decompression volume 131 that is normally provided by the storage apparatus 100. The backup computer 200 reads the compressed data from the non-decompression volume 132 or performs the writing in the non-decompression volume 132. By this means, it is possible to suppress the data transfer amount between the storage apparatus 100 and the backup computer 200, and speed up transfer processing.

A new volume for backup/restoration processing is created since, in order to access a memory area from outside of the storage apparatus 100 and read out data that is ordered meaningfully, mapping information related to a memory area that is associated with a volume is necessary. Therefore, it is necessary to go through some volume to refer to data. In a data access via a normal volume (the decompression volume 131) that is accessed by the host computer 300, the compressed data is necessarily set to be read out after decompressed. Therefore, in the present application, to transmit/receive compressed data as is to/from an external apparatus, the non-decompression volume 132 that is different from the decompression volume is created, and transmitting/receiving compressed data is achieved via the non-decompression volume 132.

The host computer 300 accesses the data stored in the compression pool 110 via the decompression volume 131. The management computer 400 manages the operation of each apparatus.

Figure 2:
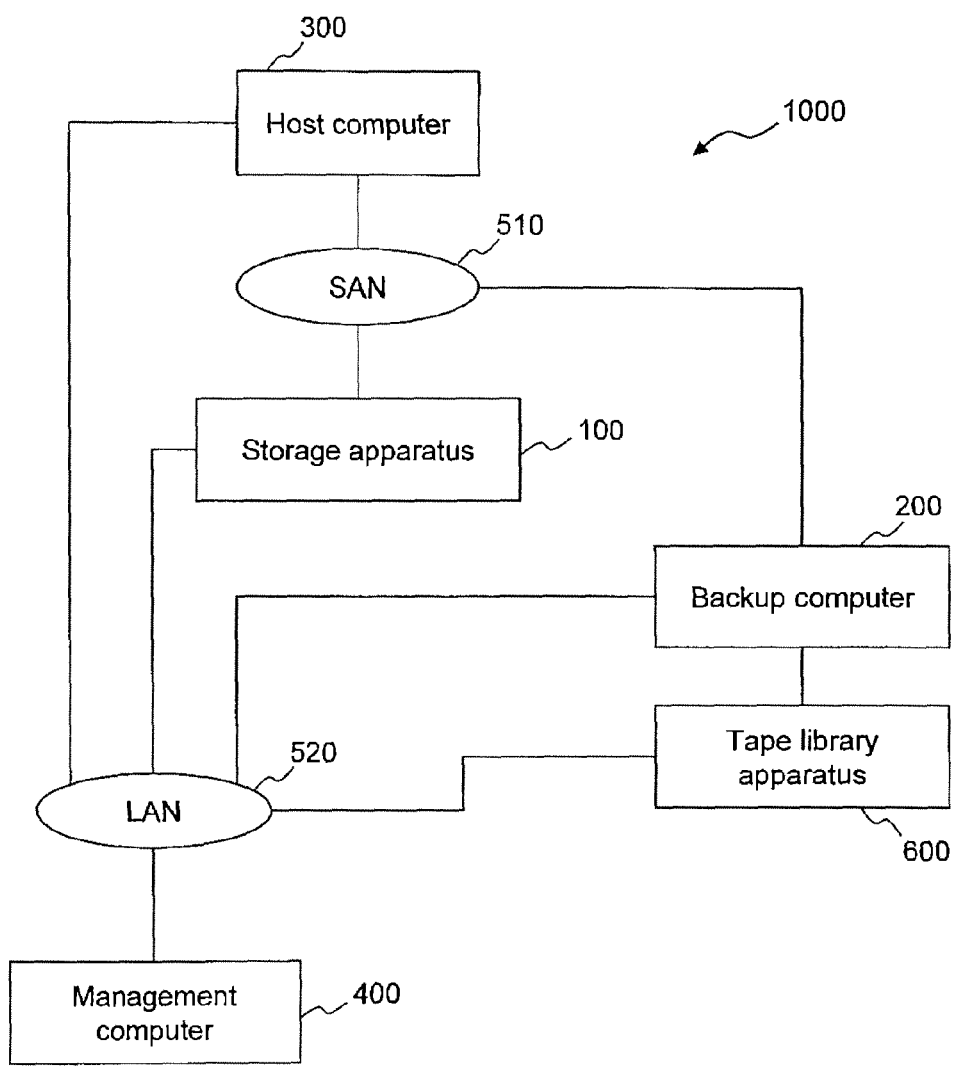
FIG. 2 is a diagram showing a network configuration of the computer system 1000.

FIG. 2 is a diagram showing a network configuration of the computer system 1000. A data transfer network such as a SAN (Storage Area Network) 510 connects between the storage apparatus 100 and the backup computer 200 and between the storage apparatus 100 and the host computer 300. A network such as a LAN (Local Area Network) 520 connects between the management computer 400 and other apparatuses. The network type is not limited these and any network type is possible as long as it can realize the similar connection condition.

The backup computer 200 has a tape library apparatus 600 as a backup medium. The management computer 400 can control an operation of the tape library apparatus 600 indirectly via the backup computer 200 or directly via the LAN 520.

Figure 3:
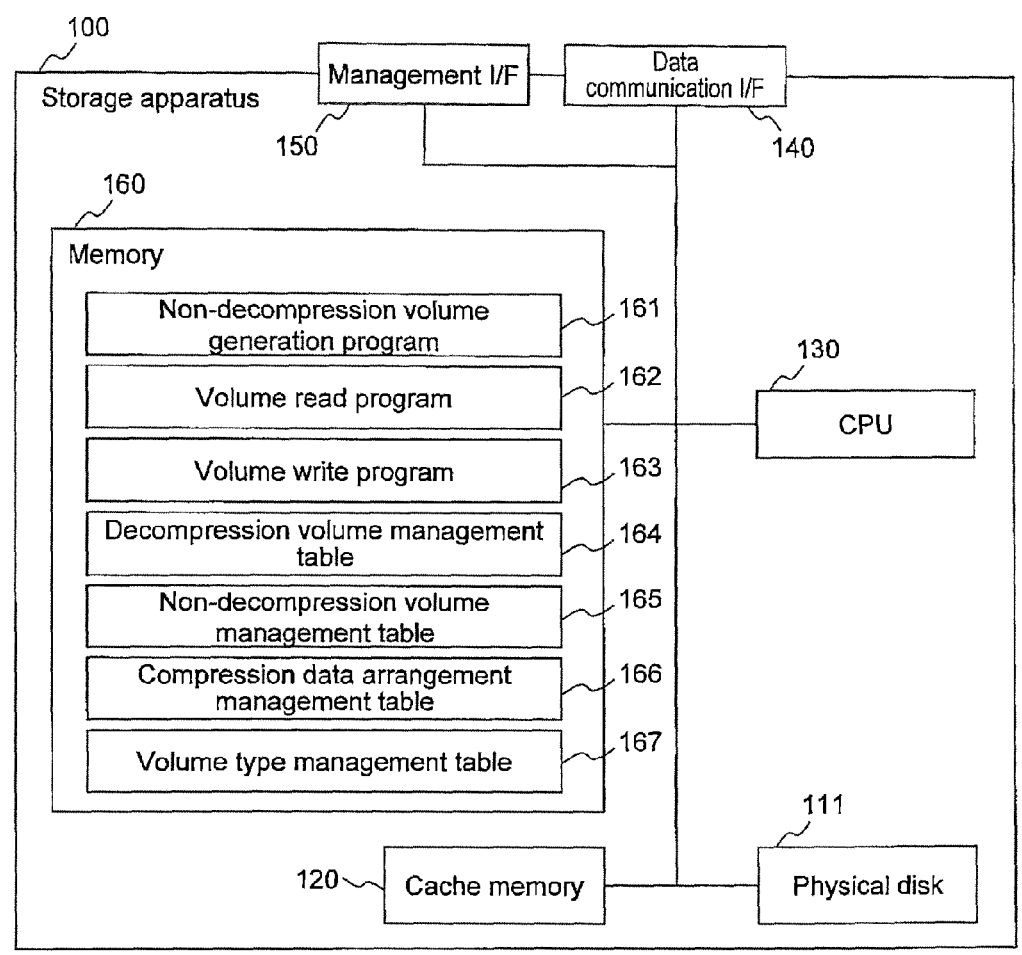
FIG. 3 is a block diagram for illustrating an internal configuration of a storage apparatus 100.

FIG. 3 is a block diagram for illustrating an internal configuration of the storage apparatus 100. The storage apparatus 100 has a physical disk 111, a CPU (Central Processing Unit) 130, a data communication I/F 140, a management I/F 150 and a memory 160 in addition to the configuration illustrated in FIG. 1.

The physical disk 111 is a memory apparatus forming the compression pool 110. The CPU 130 executes each program stored in the memory 160 to realize a function provided by the storage apparatus 100. The data communication I/F 140 transmits/receives data to/from the SAN 510. The management I/F 150 transmits/receives data to/from the LAN 520.

The memory 160 stores the non-decompression volume generation program 161, the volume read program 162, the volume write program 163, the decompression volume management table 164, the non-decompression volume management table 165, the compression data arrangement management table 166 and the volume type management table 167.

The non-decompression volume generation program 161 is a program to create the non-decompression volume 132 and reflect a correspondence relationship with the compression pool 110 to each table. The volume read program 162 is a program to read data stored in each memory area. The volume write program 163 is a program to write data in each memory area. Each table configuration will be described later.

Figure 4:
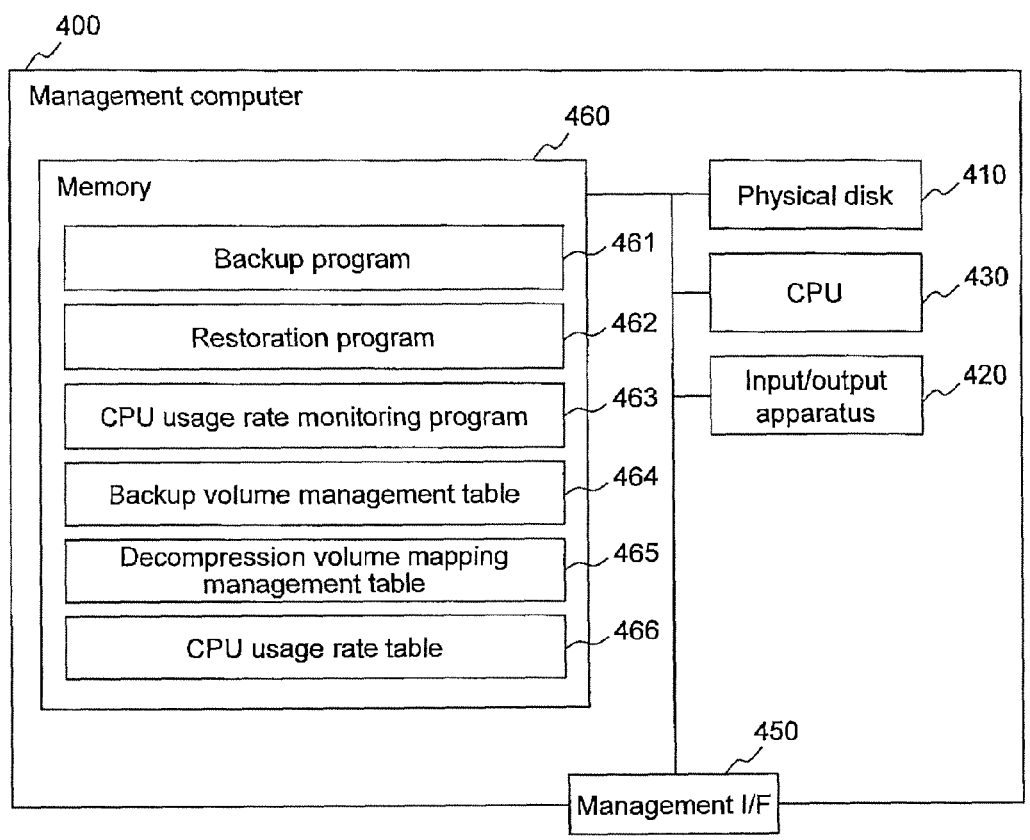
FIG. 4 is a block diagram for illustrating an internal configuration of a management computer 400.

FIG. 4 is a block diagram for illustrating an internal configuration of the management computer 400. The management computer 400 has a physical disk 410, a CPU 430, an input/output apparatus 420, a management I/F 450 and a memory 460.

The physical disk 410 is an apparatus that stores data. The CPU 430 executes each program stored in the memory 460 to realize a function provided by the management computer 400. The input/output apparatus 420 is an apparatus used by the user of the management computer 400 to operate the management computer 400. The management I/F 450 transmits/receives data to/from the LAN 520.

The memory 460 stores the backup program 461, the restoration program 462, a CPU usage rate monitoring program 463, a backup volume management table 464, the decompression volume mapping management table 465, the CPU usage rate table 466, and a backup data compression status management table 467.

The backup program 461 is a program to back up data stored in the storage apparatus 100 to the tape library apparatus 600. The restoration program 462 is a program to restore backup data stored in the tape library apparatus 600 to the storage apparatus 100. The CPU usage rate monitoring program 463 is a program to monitor the usage rate of the CPU 130 held in the storage apparatus 100 and store the result in the CPU usage rate table 466. Each table configuration will be described later.

Figure 5:
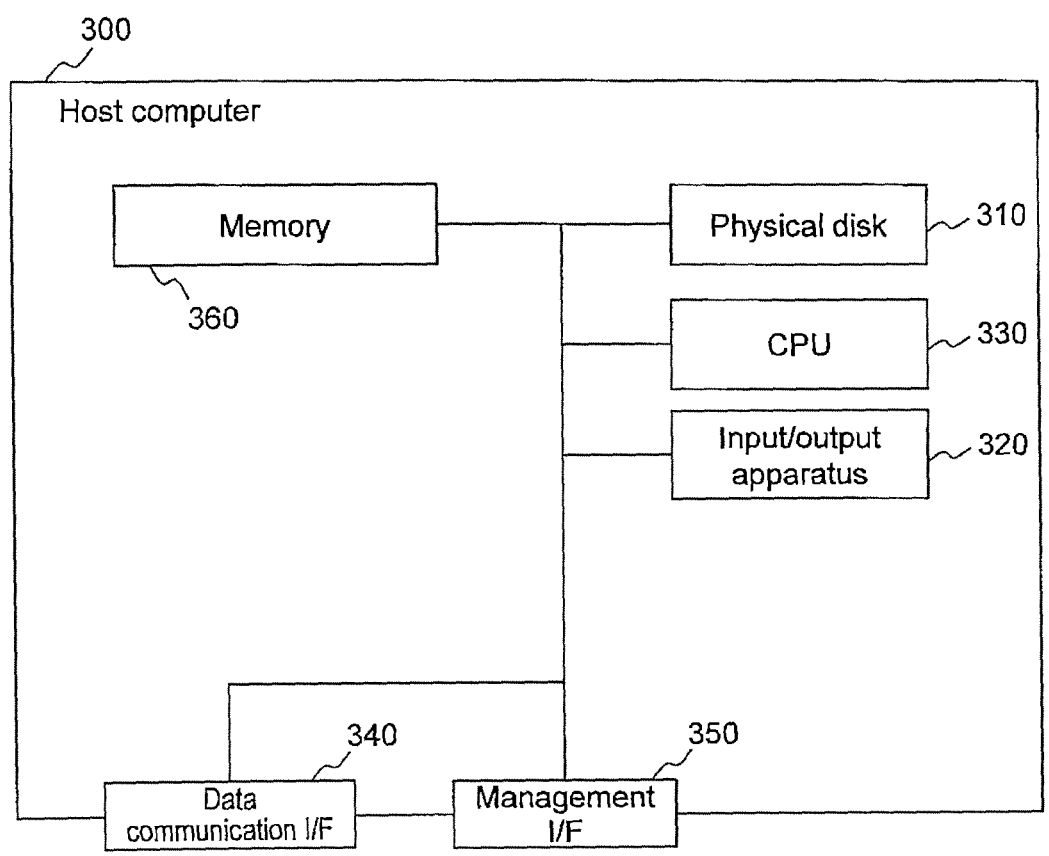
FIG. 5 is a block diagram for illustrating an internal configuration of a host computer 300.

FIG. 5 is a block diagram for illustrating an internal configuration of the host computer 300. The host computer 300 has a physical disk 310, a CPU 330, an input/output apparatus 320, a data communication I/F 340, a management I/F 350 and a memory 360.

The physical disk 310 is an apparatus that stores data. The CPU 330 controls an operation of the host computer 300. The input/output apparatus 320 is an apparatus used by the user of the host computer 300 to operate the host computer 300. The data communication I/F 340 transmits/receives data to/from the SAN 510. The management I/F 350 transmits/receives data to/from the LAN 520. The memory 360 memorizes data that is temporarily used by the CPU 330.

Figure 6:
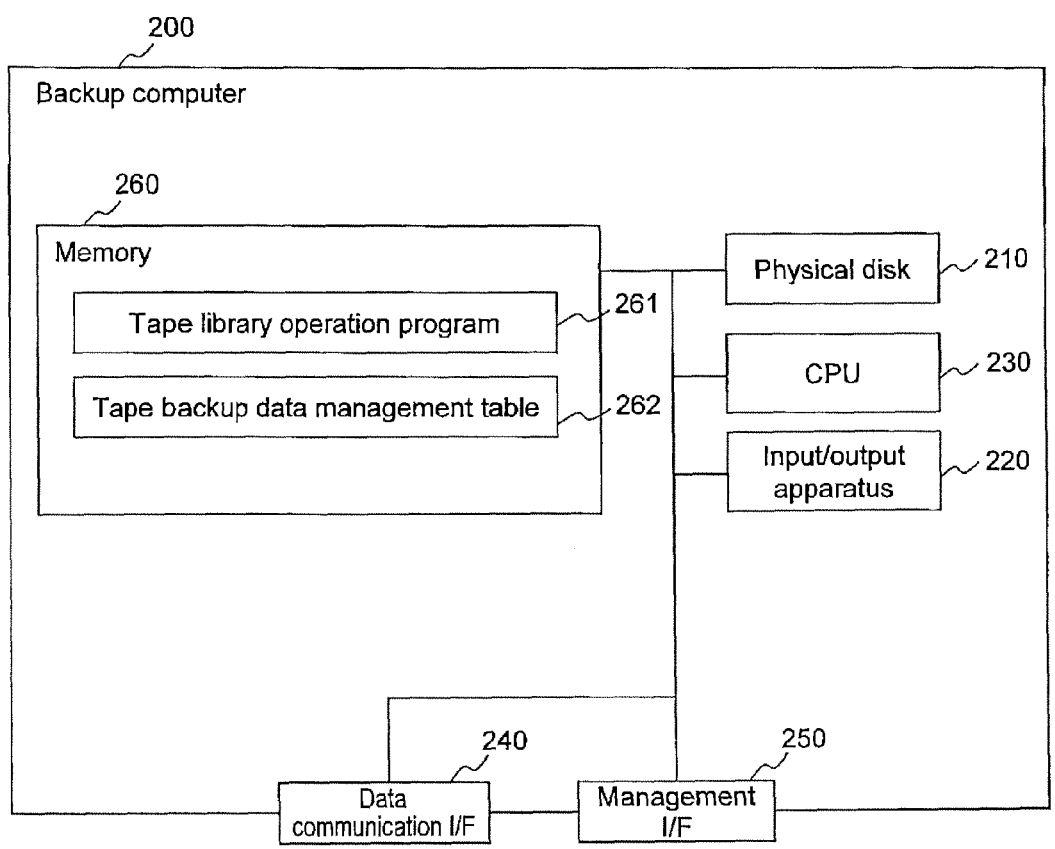
FIG. 6 is a block diagram for illustrating an internal configuration of a backup computer 200.

FIG. 6 is a block diagram for illustrating an internal configuration of the backup computer 200. The backup computer 200 has a physical disk 210, a CPU 230, an input/output apparatus 220, a data communication I/F 240, a management I/F 250 and a memory 260.

The physical disk 210 is an apparatus that stores data. The CPU 230 executes each program stored in the memory 260 to realize a function provided by the backup computer 200. The input/output apparatus 220 is an apparatus used by the user of the backup computer 200 to operate the backup computer 200. The data communication I/F 240 transmits/receives data to/from the SAN 510. The management I/F 250 transmits/receives data to/from the LAN 520.

The memory 260 stores a tape library operation program 261 and a tape backup data management table 262. The tape library operation program 261 is a program for controlling the tape library apparatus 210. A configuration of the tape backup data management table 262 will be described later.

FIG. 7 is a block diagram for illustrating an internal configuration of the tape library apparatus 600. The tape library apparatus 600 has a tape medium 610, a CPU 630, a data communication I/F 640, a management I/F 650 and a memory 660.

The tape medium 610 is a memory medium to store backup data backed up from the storage apparatus 100. The CPU 630 executes each program stored in the memory 660 to realize a function provided by the tape library apparatus 600. The data communication I/F 640 transmits/receives data to/from the SAN 510. The management I/F 650 transmits/receives data to/from the LAN 520.

The memory 660 stores a tape medium control program 661 and a backup data compression program 662. The tape medium control program 661 is a program to control operations of the tape medium 610 and a drive that reads/writes data from/in the tape medium 610. The backup data compression program 662 is a program to compress data written in the tape medium 610 or decompress compressed data stored in the tape medium 610.

FIG. 8 is a diagram for illustrating a configuration of the decompression volume management table 164. The decompression volume management table 164 is a table to manage a data arrangement in the decompression volume 131 and has a decompression volume ID 1641, a pool ID 1642, a decompression volume LBA (Logical Block Address) 1643, a compression data ID 1644 and a compression data length 1645.

The decompression volume ID 1641 is the ID to uniquely identify each decompression volume 131 in the storage apparatus 100. The pool ID 1642 is the ID of the compression pool 110 corresponding to the decompression volume ID 1641. The decompression volume LBA 1643 is a logical block address in the decompression volume 131. The compression data ID 1644 is the ID of compressed data stored in a logical block address designated by the decompression volume LBA 1643. The compression data length 1645 is the data size of the compressed data designated by the compression data ID 1644.

FIG. 9 is a diagram showing a configuration of the compression data arrangement management table 166. The compression data arrangement management table 166 is a table to manage a data arrangement in the compression pool 110 and has a compression data ID 1661 and a pool LBA range 1662.

The compression data ID 1661 is the ID to uniquely identify compression data stored in the compression pool 110 and corresponds to the compression data ID 1664. The pool LBA range 1662 indicates a logical address in the compression pool 110 storing compressed data designated by the compression data ID 1661, using the starting address and the ending address.

FIG. 10 is a diagram showing a configuration of the non-decompression volume management table 165. The non-decompression volume management table 165 is a table to manage an arrangement of compression data in the non-decompression volume 132 and has a non-decompression volume ID 1651, a pool ID 1652, a compression data ID 1653 and a non-decompression volume LBA range 1654.

The non-decompression volume ID 1651 is the ID to uniquely identify each non-decompression volume 132 in the storage apparatus 100. The pool ID 1652 is the ID of the compression pool 110 referred to by the non-decompression volume 132 designated by the non-decompression volume ID 1651 and corresponds to the pool ID 1642. The compression data ID 1653 is the ID of compressed data stored in the non-decompression volume 132 designated by the non-decompression volume ID 1651 and corresponds to the compression data ID 1644. The non-decompression volume LBA range 1654 indicates a logical address in the non-decompression volume 132 storing compressed data designated by the compression data ID 1653, using the starting address and the ending address.

FIG. 11 is a diagram showing a configuration of the volume type management table 167. The volume type management table 167 is a table to manage the types of memory areas held in the storage apparatus 100 and has a volume ID 1671 and a volume type 1672.

The volume ID 1671 holds the IDs of memory areas held in the storage apparatus 100. Here, the memory areas are the decompression volume 131, the non-decompression volume 132 and an external volume. The external volume is a memory area provided by a different storage apparatus set outside the storage apparatus 100 or a memory area processed as a memory area held by the storage apparatus 100. The volume type 1672 holds the types of the above memory areas.

FIG. 12 is a diagram showing a configuration of the backup volume management table 464. The backup volume management table 464 is a table to manage information about backup targets in the memory areas (i.e. volumes) provided by the storage apparatus 100 and has a storage apparatus ID 4641, a volume ID 4642, an external volume flag 4643, an external storage apparatus ID 4644, an external volume ID 4645, a decompression volume flag 4646, a non-decompression volume flag 4647 and a non-decompression volume ID 4648.

In a case where there are a plurality of storage apparatuses 100, the storage apparatus ID 4641 is the ID to identify each of the storage apparatus 100. The volume ID 4642 is the ID to identify a memory area (i.e. volume) provided by the storage apparatus 100, seen from the management computer 400. Its value does not necessarily correspond to the ID used in the storage apparatus 100. If they are different, the management computer 400 or the storage apparatus 100 suitably converts the volume ID 4642 into a value that can be recognized by the own apparatus. The external volume flag 4643, the decompression volume flag 4546 and the non-decompression volume flag 4647 are flags indicating the type of a memory area designated by the volume ID 4642. When the external volume flag 4643 indicates "True," the external storage apparatus ID 4644 indicates the ID of a storage apparatus providing an external volume that is the substance of the volume. The external volume ID 4645 is the ID of the external volume. When the non-decompression volume flag 4647 indicates "True," the non-decompression volume ID 4648 is the ID of the non-decompression volume.

FIG. 13 is a diagram showing a configuration of the decompression volume mapping management table 465. The decompression volume mapping management table 465 is a table to manage a correspondence relationship between the non-decompression volume 132 and the decompression volume 131, and has a storage apparatus ID 4651, a non-decompression volume ID 4652, a compression pool ID 4653, a non-decompression volume LBA range 4654, a compression data ID 4655 and a decompression volume LBA 4656.

In a case where there are a plurality of storage apparatuses 100, the storage apparatus ID 4651 is the ID to identify each of the storage apparatus 100. The non-decompression volume ID 4652 is the ID to identify the non-decompression volume 132. The compression pool ID 4653 is the ID to identify the compression pool 110. The non-decompression volume LBA range 4654 indicates a logical block address of a memory area in which compressed data in the non-decompression volume 132 is arranged, using the starting address and the ending address. The compression data ID 4655 is the ID to uniquely identify compressed data. The decompression volume LBA 4656 holds a logical block address of a memory area in which the compressed data designated by the compression data ID 4655 is arranged in the decompression volume 131.

FIG. 14 is a diagram showing a configuration of the CPU usage rate table 466. The CPU usage rate table 466 is a table to manage the usage rate of the CPU 130 held in each storage apparatus 100 and has a storage apparatus ID 4661 and an average CPU usage rate 4662.

In a case where there are a plurality of storage apparatuses 100, the storage apparatus ID 4661 is the ID to identify each of the storage apparatuses 100. The average CPU usage rate 4662 holds the average usage rate of the CPU 130 held in each storage apparatus 100.

FIG. 15 is a diagram showing a configuration of the tape backup data management table 262. The tape backup data management table 262 is a table to manage a correspondence relationship between backup data stored in the tape medium 610 and volumes provided by the storage apparatus 100, and has a storage apparatus ID 2621, a volume ID 2622, an address 2623, a compression flag 2624, and a date 2625.

In a case where there are a plurality of storage apparatuses 100, the storage apparatus ID 2621 is the ID to identify each of the storage apparatuses 100. The volume ID 2622 is the ID to identify a memory area (i.e. volume) provided by the storage apparatus 100, seen from the management computer 400. The address 2623 holds an address on the tape medium 610, which stores backup data of a memory area designated by the volume ID 2622. The compression flag 2624 is a flag indicating whether backup data designated by the address 2623 is compressed by a backup calculator 200. The date 2625 is a date when a backup was finished. The content of the date 2625 is the same as that of the date 4671 described later.

Figure 30:
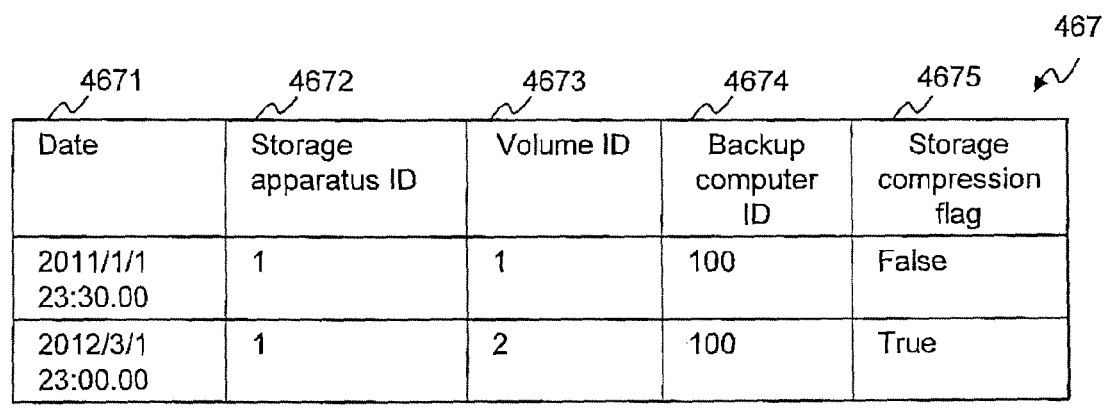
FIG. 30 is a diagram showing a configuration of a backup data compression status management table 467.

FIG. 30 is a diagram showing a configuration of the backup data compression status management table 467. The backup data compression status management table 467 is a table that manages a compression status performed by the storage apparatus 100 for backup data stored in the tape media 610. The backup data compression status management table 467 includes a date 4671, a storage apparatus ID 4672, a volume ID 4673, a backup computer ID 4674, and a storage compression flag 4675.

The date 4671 is a date when a backup was finished, the content of which is the same as that of the date 2625. The storage apparatus ID 4672 is, if a plurality of the storage apparatus 100 exists, an ID for identifying each of the storage apparatus 100. The volume ID 4673 is an ID for identifying a memory area (volume) provided by the storage apparatus 100 as seen from the management computer 400. The backup computer ID 4674 is an ID for identifying the backup computer. The storage compression flag 4675 is a flag indicating whether the backup data stored in the tape library 600 included in the backup computer 200 designated by the backup computer ID 4674 finished in the date 4671 is compressed by a storage apparatus 100 or not.

Example 1

Operation of Computer System 1000

Figure 16:
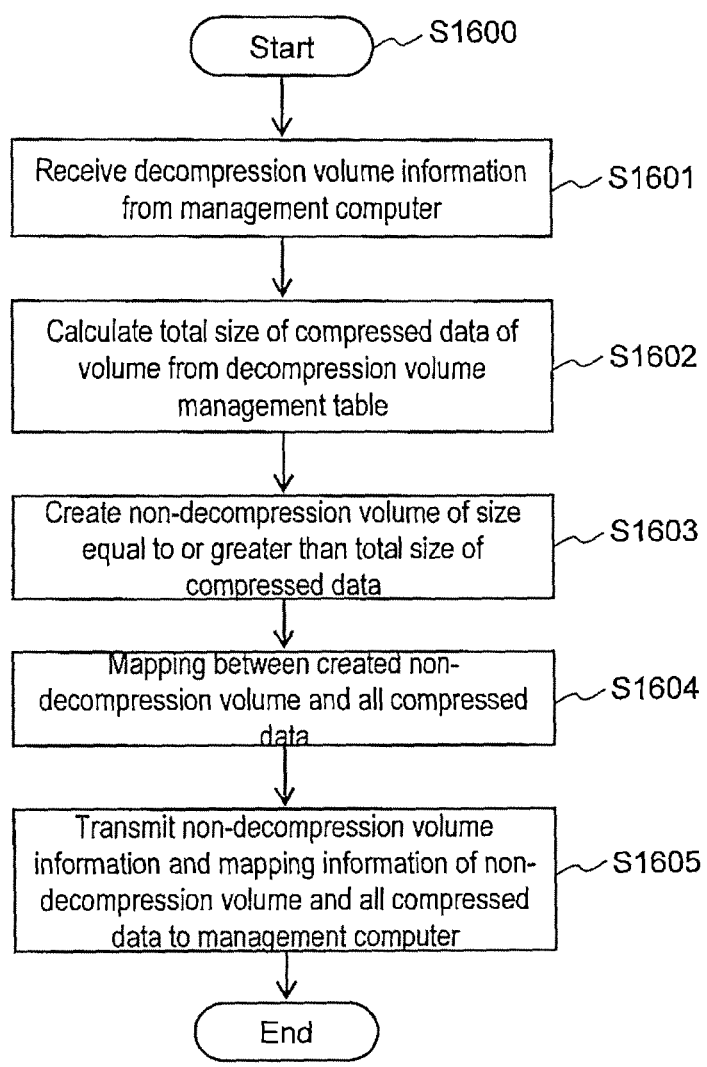
FIG. 16 is a flowchart for explaining an operation that a non-decompression volume generation program 161 generates a non-decompression volume 132.

FIG. 16 is a flowchart for illustrating an operation of generating the non-decompression volume 132 in the non-decompression volume generation program 161 of the storage apparatus 100. In the following, each step in FIG. 16 will be explained.

(FIG. 16: step S1600)

The management computer 400 instructs the storage apparatus 100 to generate the non-decompression volume 132 corresponding to the decompression volume 131. To generate the non-decompression volume 132 corresponds to preprocessing for implementing backup or restoration in the backup computer 200. Therefore, this instruction may be given at appropriate timing before the backup computer 200 implements backup. Specifically, when the management computer 400 receives an instruction to backup the decompression volume 131 without decompression, the management computer 400 checks whether or not the non-decompression volume 132 corresponding to the decompression volume 131 exists in the storage apparatus 100. If the non-decompression volume 132 corresponding to the decompression volume 131 does not exist, the management computer 400 instructs to the storage apparatus 100 to create the non-decompression volume 132 corresponding to the decompression volume 131. When the storage apparatus 100 receives this instruction, the present flowchart starts.

(FIG. 16: Step S1601)

The non-decompression volume generation program 161 receives, from the management computer 400, management information of the decompression volume 131 corresponding to the non-decompression volume 132 to be created. This management information includes the ID of the decompression volume 131.

(FIG. 16: Step S1602)

The non-decompression volume generation program 161 finds the total size of compressed data stored in the decompression volume 131 for the non-decompression volume 132 to be created, by the decompression volume management table 164. To be more specific, the compression data length 1645 of the corresponding decompression volume ID 1641 may be summed up.

(FIG. 16: Steps S1603 and S1604)

The non-decompression volume generation program 161 creates the non-decompression volume 132 equal to or greater than the total size of compressed data found in step S1602 (S1603). The non-decompression volume generation program 161 associates the created non-decompression volume 132 with all compressed data in the decompression volume 131 designated by the management computer 400 (i.e. mapping) and reflects the correspondence relationships to the non-decompression volume management table 165 (S 1604). By this means, the non-decompression volume 132 is set to refer to the storage location of compressed data on the compression pool designated by the management computer 400. In the compression pool 131, compression or decompression of data is necessarily managed to be performed on the cache memory 120 when normal data read/write operation is performed. Meanwhile, in the non-decompression volume 132, the storage location that is directly associated is read/written. Thus, reading/writing compressed data on the compression pool 110 without decompression can be performed by a process that is not different from the process of normal data read/write.

(FIG. 16: Step S1605)

The non-decompression volume generation program 161 transmits information such as the ID of the non-decompression volume 132 that was newly created, and information of the correspondence relationships between the newly created non-decompression volume 132 and the compressed data (i.e. mapping information), to the management computer 400. The management computer 400 reflects these items of information to the decompression volume mapping management table 465.

Figure 17:
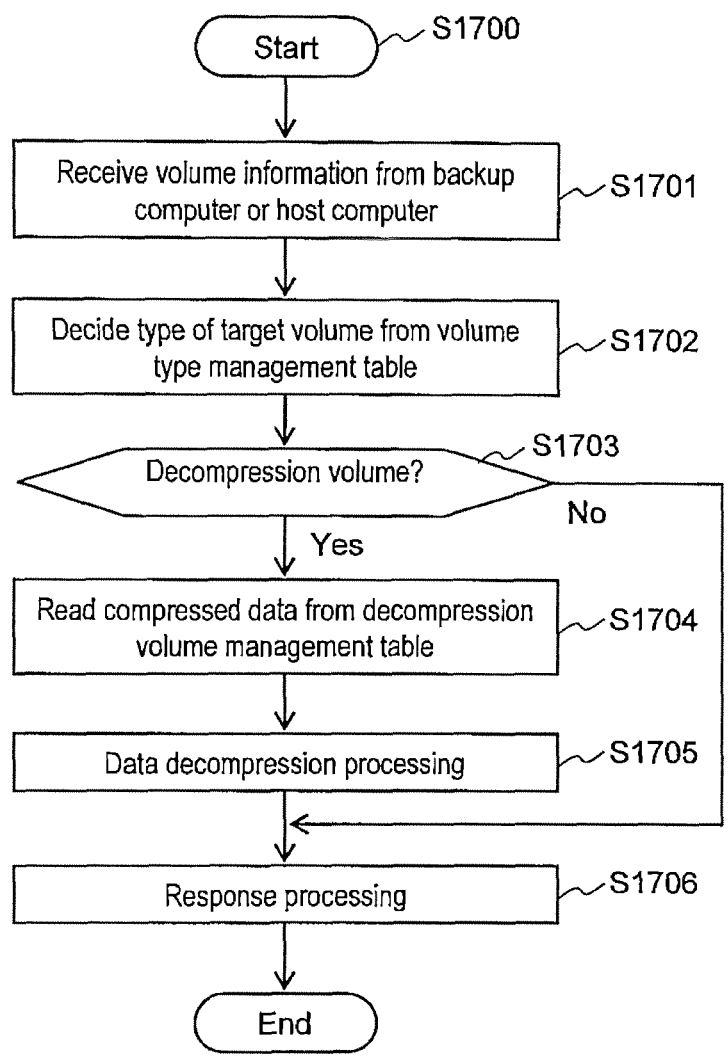
FIG. 17 is a flowchart for illustrating an operation that a volume read program 162 reads data from a memory area (i.e. volume) in the storage apparatus 100.

FIG. 17 is a flowchart for illustrating an operation that the volume read program 162 of the storage apparatus 100 reads data from a memory area (i.e. volume) in the storage apparatus 100. In the following, each step in FIG. 17 will be explained.

(FIG. 17: Step S1700)

The backup computer 200 or the host computer 300 designates a volume where data to be read out is stored and a location where the data to be read out is stored, and requests the storage apparatus 100 to read data. When the storage apparatus 100 receives this request, the present flowchart starts.

(FIG. 17: Step S1701)

The volume read program 162 receives, from the requesting computer, management information of a volume storing data to be read that is designated in the read out request. This management information includes the ID of the non-decompression volume.

(FIG. 17: Steps S1702 and S1703)

The volume read program 162 decides the type of the volume storing the requested data with reference to the volume type management table 167 (S1702). If the volume is the decompression volume 131, the flow proceeds to step S1704, and, otherwise, the flow skips to step S1706 (S1703).

(FIG. 17: Step S1703: Supplement)

If the decision result in this step is "No," it follows that the volume is a normal volume different from the decompression volume 131 or the non-decompression volume 132. If it is the normal volume, the volume read program 162 may read the requested data as is. If it is the non-decompression volume 132, it corresponds to a case where the backup computer 200 obtains compressed backup target data via the non-decompression volume 132, and therefore the compressed data may be read as is. Therefore, in any case, it is possible to omit steps S1704 and 1705.

(FIG. 17: Steps S1704 and S1705)

The volume read program 162 obtains a logical block address of the requested compressed data in the compression pool from the decompression volume management table 164 and reads the compression data from a corresponding address in the compression pool 110 (S 1704). The volume read program 162 decompresses the read compressed data and stores the result in the cache memory 120 (S 1705).

(FIG. 17: Step S1706)

In the case of deciding "Yes" in step S1703, the volume read program 162 returns the decompressed data stored in the cache memory 120 to the requesting computer. In the case of deciding "No" in step S1703, it reads the requested data as is and returns it to the requesting computer.

Figure 18:
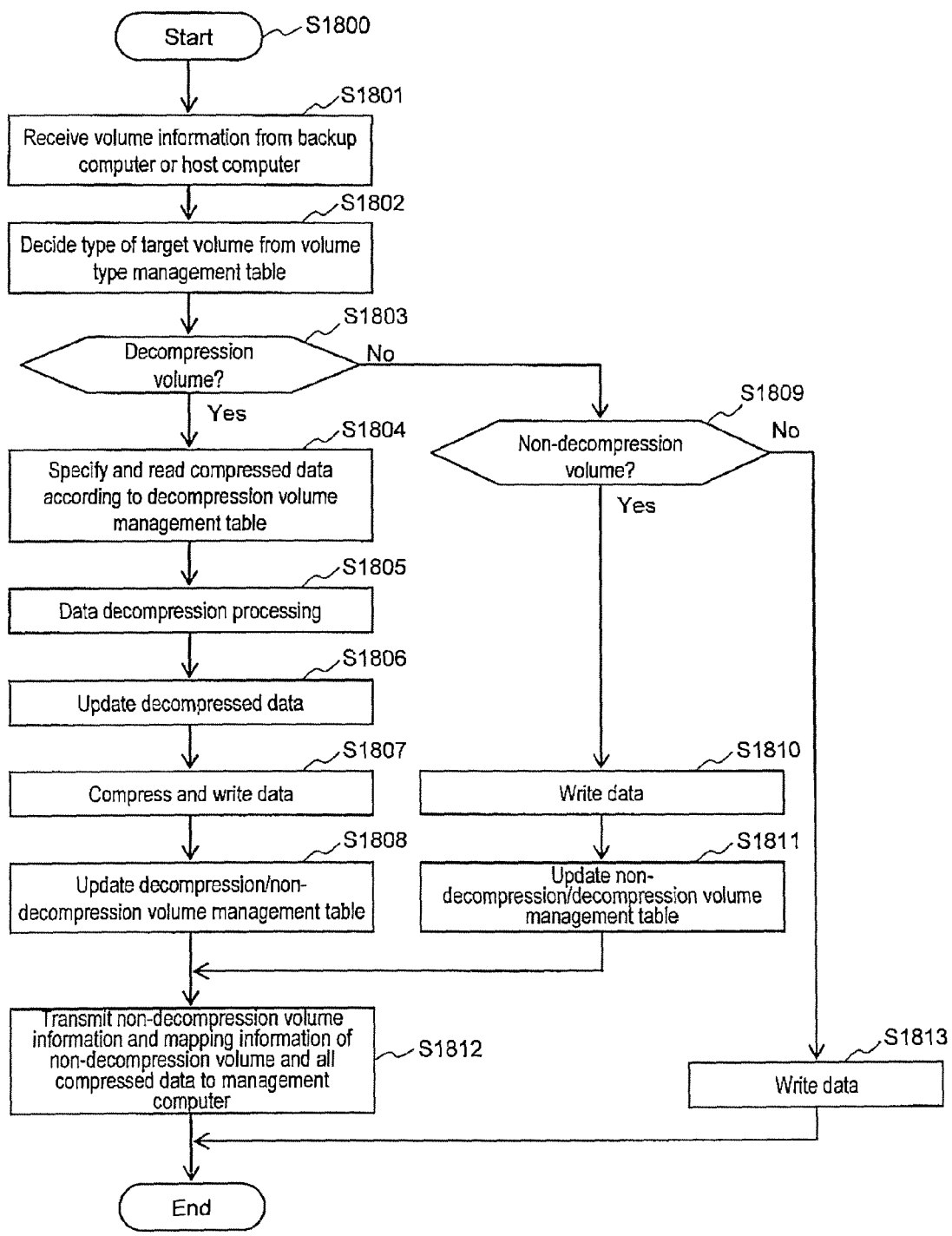
FIG. 18 is a flowchart for illustrating an operation that a volume write program 163 writes data in a memory area (i.e. volume) in the storage apparatus 100.

FIG. 18 is a flowchart for illustrating an operation that the volume write program 163 of the storage apparatus 100 writes data in a memory area (i.e. volume) in the storage apparatus 100. In the following, each step in FIG. 18 will be explained.

(FIG. 18: Step S1800)

The backup computer 200 or the host computer 300 designates data to be written, a volume to write the data, and a location to write the data, and requests the storage apparatus 100 to write data. When the storage apparatus 100 receives this request, the present flowchart starts.

(FIG. 18: Step S1801)

The volume write program 163 receives management information of the data writing destination volume from the requesting computer. This management information includes the ID of the volume.

(FIG. 18: Steps S1802 and S1803)

The volume write program 163 decides the type of the writing destination volume with reference to the volume type management table 167 (S 1802). If the volume is the decompression volume 131, the flow proceeds to step S1804, and, otherwise, the flow skips to step S1809 (S 1803).

(FIG. 18: Steps S1804 and S1805)

The volume write program 163, if compressed data in the compression pool 110 corresponding to the logical block address of the writing destination exists according to the decompression volume management table 164, reads the compressed data from the compression pool 110 (S1804), and decompresses the read compressed data and stores the result in the cache memory 120 (S1805).

(FIG. 18: Steps S1806 and S1807)

The volume write program 163 writes data requested to be written, over the decompressed data stored on the cache memory 120 (S 1806). The volume write program 163 decompresses the overwritten data and writes the result in the reading address of the compression pool 110 (S1807). In writing new data, the data requested to be written is compressed on the cache memory 120, and the data is written to the compression pool 110.

(FIG. 18: Step S1808)

The volume write program 163 updates the decompression volume management table 164 and the non-decompression volume management table 165. To be more specific, the data length and logical block address of compressed data are updated according to the writing result in step S1807. This step will be explained in detail in next FIG. 19.

(FIG. 18: Step S1809)

In the volume write program 163, if the type of the writing destination volume is the non-decompression volume 132, the flow proceeds to step S1810, and, otherwise, the flow proceeds to step S1812.

(FIG. 18: Step S1810)

The volume write program 163 writes data requested to be written to the requested memory area in the non-decompression volume 132 of the writing destination, as in writing to a normal volume. Actually, it is written in a corresponding memory area in the compression pool 110 referred to by the non-decompression volume 132. This step corresponds to a case where the backup computer 200 restores compressed restoration target data as is in the compression pool 110 via the non-decompression volume 132.

(FIG. 18: step S1810: Supplementation)

In a case such as restoring a differential backup from a tape device, the process in this step could be a overwrite process. In both of overwriting/new writing, a writing process is performed to the uncompressed volume by the same process as that of writing to a normal volume.

(FIG. 18: Step S1811)

The volume write program 163 updates the non-decompression volume management table 165 and the decompression volume management table 164. To be more specific, the data length and logical block address of compressed data are updated according to the writing result in step S1810. This step will be explained in detail in next FIG. 19.

(FIG. 18: Step S1812)

The volume write program 163 transmits update content of the decompression volume management table 164 and the non-decompression volume management table 165 to the management computer 400. The management computer 400 reflects the received update content to the decompression volume mapping management table 465.

(FIG. 18: Step S1813)

The volume write program 163 writes data requested to be written, in the writing destination volume. This step corresponds to the case of writing data in a normal volume different from the decompression volume 131 and the non-decompression volume 132.

Figure 19:
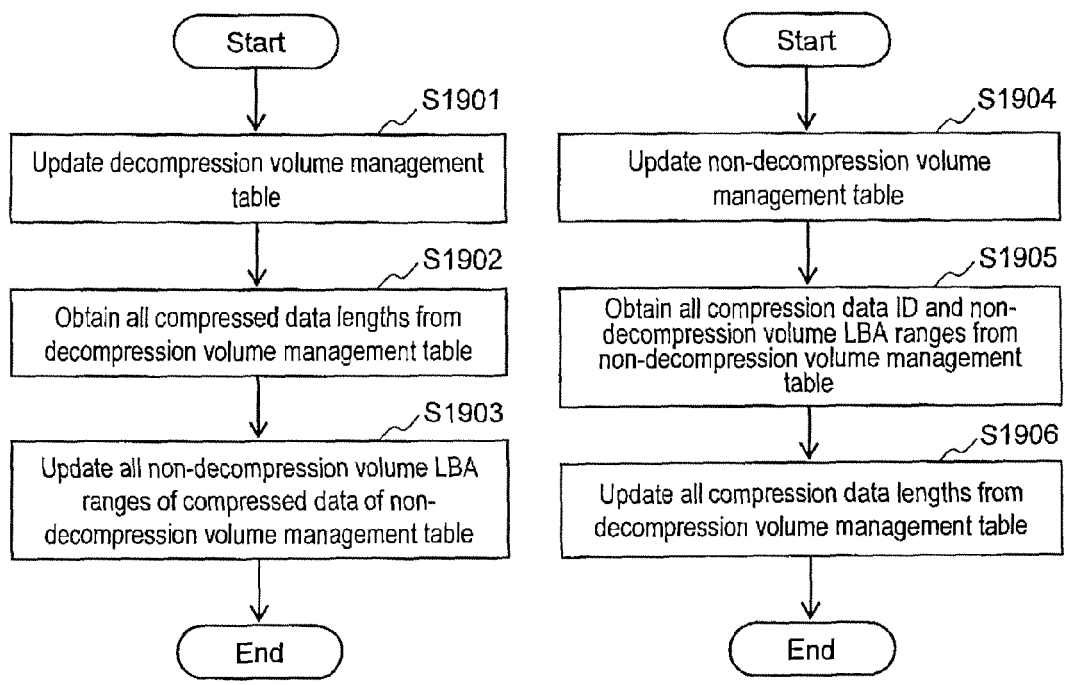
FIG. 19 is a flowchart for explaining step S1808 in detail.

FIG. 19 is a flowchart for illustrating step S1808 in detail. Steps S1901 and S1904 may be conducted in order or conducted in parallel. In the following, each step in FIG. 19 will be explained.

(FIG. 19: Steps S1901 and S1902)

The volume write program 163 updates the decompression volume management table 164 according to the writing result in step S1807 (S1901). The volume write program 163 obtains all compression data lengths 1645 related to updated portions, according the updated decompression volume management table 164 (S1902).

(FIG. 19: Step S1903)

The volume write program 163 updates all non-decompression volume LBA ranges 1654 related to the updated portions in the non-decompression volume management table 165, in coordination with the updated compression data lengths 1645.

(FIG. 19: Steps S1904 and S1905)

The volume write program 163 updates the non-decompression volume management table 165 according to the writing result in step S1807 (S1904). The volume write program 163 obtains all compression data IDs 1653 and non-decompression volume LBA ranges 1654 related to updated portions in the non-decompression volume management table 165 (S 1905).

(FIG. 19: Step S1906)

The volume write program 163 updates all compression data lengths 1645 related to updated portions in the decompression volume management table 164, in coordination with the updated non-decompression volume LBA ranges 1654.

Figure 20:
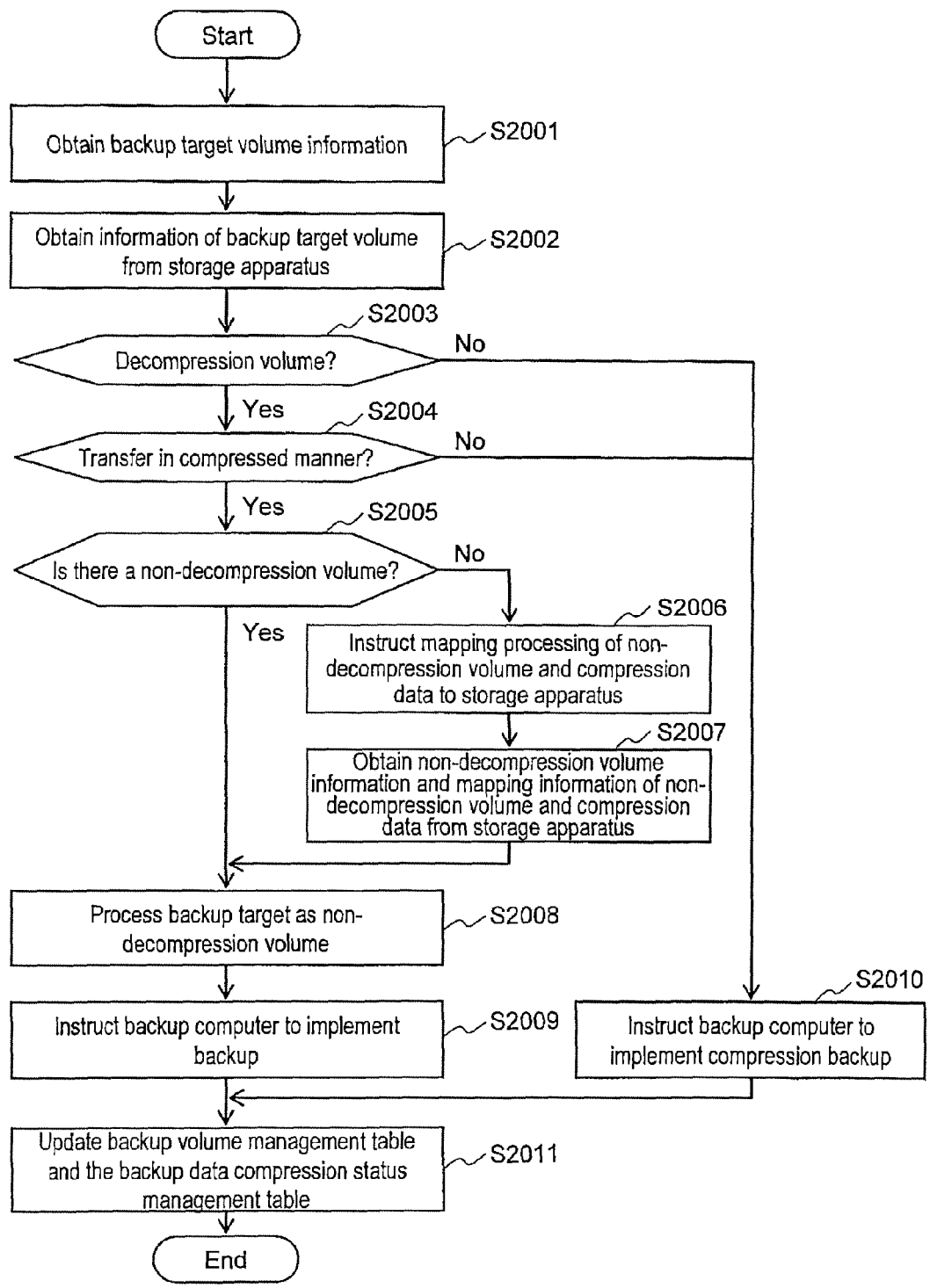
FIG. 20 is a flowchart for explaining operations of a backup program 461.

FIG. 20 is a flowchart for illustrating operations of the backup program 461. Based on, for example, a predetermined backup schedule or an instruction to implement backup via the input/output apparatus 420, the management computer 400 activates the backup program 461 to execute the present flowchart. In the following, each step in FIG. 20 will be explained.

(FIG. 20: Steps S2001 and S2002)

The backup program 461 obtains an instruction as to which volume is processed as a backup target, according to a preset schedule or an instruction from an outside device (S2001). The backup program 461 obtains information about the backup target volume from the storage apparatus 100 (S2002). This information includes the type of the backup target volume.

(FIG. 20: Step S2003)

The backup program 461 decides whether the backup target volume is the decompression volume 131. If it is the decompression volume 131, the flow proceeds to step S2004, and, otherwise, the flow skips to step S2010.

(FIG. 20: Step S2004)

The backup program 461 decides whether to transfer the backup target volume in a compressed form from the storage apparatus 100 to the backup computer 200. This decision can be designated by, for example, an option setting at the time of activating the backup program 461, or it can be determined by the management computer 400. In the case of performing transferring in a compressed manner, data is transferred via the non-decompression volume 132, and, otherwise, data is transferred via the decompression volume 131. In the case of performing transferring in a compressed manner, the flow proceeds to step S2005, and, otherwise, the flow skips to step S2010.

(FIG. 20: Step S2005)

The backup program 461 decides whether the non-decompression volume 132 required to transfer data in the backup target volume to the backup computer 200 in a compressed manner is already created. If there is the corresponding non-decompression volume 132, the flow skips to step S2008, and, otherwise, the flow proceeds to step S2006.

(FIG. 20: Step S2006)

The backup program 461 instructs the storage apparatus 100 to create the non-decompression volume 132 corresponding to the compressed data stored in the backup target volume. The storage apparatus 100 creates the corresponding non-decompression volume 132 according to the instruction in step S2006 and reflects its content to the non-decompression volume management table 165.

(FIG. 20: Step S2007)

The backup program 461 receives, from the storage apparatus 100, content of the non-decompression volume management table 165 to which information about the newly created non-decompression volume 132 is reflected, and reflects it to the decompression volume mapping management table 465.

(FIG. 20: Steps S2008 and S2009)

The backup program 461 determines the non-decompression volume 132 as a backup target volume (S2008). The backup program 461 instructs the backup computer 200 to retrieve backup target compressed data via the non-decompression volume 132, and to store the retrieved data to the tape media 610 without compression. The backup computer 200 implements backup according to this instruction (S2009).

(FIG. 20: Step S2010)

The backup program 461 instructs the backup computer 200 to obtain the backup target data, compress it and store the result in the tape medium 610. The backup computer 200 implements backup according to this instruction.

(FIG. 20: Step S2011)

The backup program 461 updates the backup volume management table 464 and the backup data compression status management table 467 based on the content in the above steps, and the present flowchart is terminated.

Figure 21:
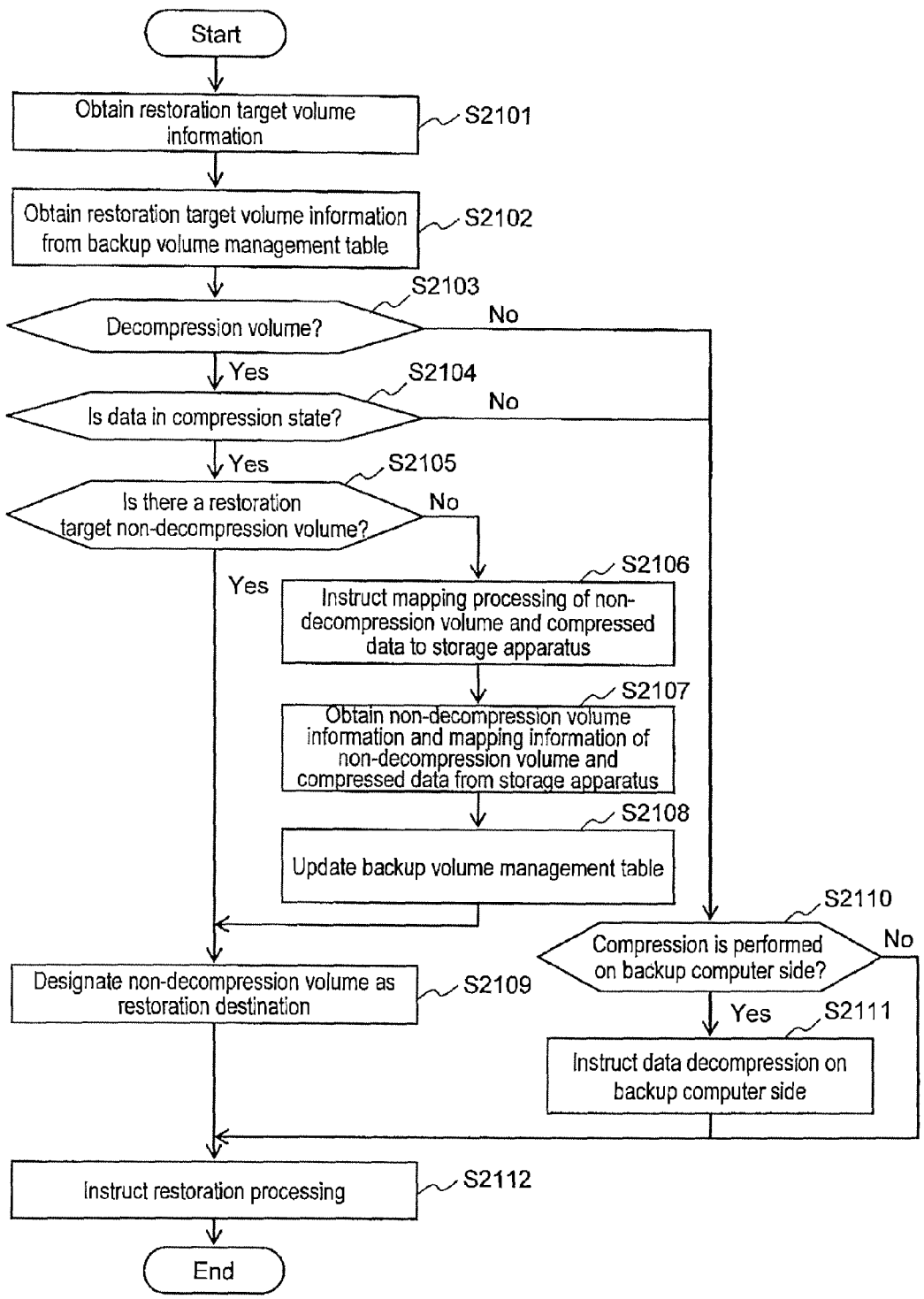
FIG. 21 is a flowchart for explaining operations of a restoration program 462.

FIG. 21 is a flowchart for illustrating operations of the restoration program 462. For example, when the management computer 400 is instructed to implement restoration based on a predetermined restoration schedule or via the input/output apparatus 420, the management computer 400 activates the restoration program 462 to start the present flowchart. In the following, each step in FIG. 21 will be explained.

(FIG. 21: Steps S2101 and S2102)

The restoration program 462 obtains an instruction as to which volume is processed as a restoration target (S2101). The restoration program 462 obtains information of the restoration target volume from the backup volume management table 464 (S2102). This information includes the type of the restoration target volume.

(FIG. 21: Step S2103)

The restoration program 462 decides whether the restoration target volume is the decompression volume 131. If it is the decompression volume 131, the flow proceeds to step S2104, and, otherwise, the flow skips to step S2110.

(FIG. 21: Step S2104)

The restoration program 462 decides whether the restoration target data is data compressed in the storage apparatus 100, according to the backup data compression status management table 467 and the tape backup data management table 262. When it is compressed, the flow proceeds to step S2105, and, otherwise, the flow skips to step S2110.

(FIG. 21: Step S2105)

The restoration program 462 decides whether the non-decompression volume 132 required to transfer the restoration target data to the storage apparatus 100 in a compressed manner is already created. If there is the corresponding non-decompression volume 132, the flow skips to step S2109, and, otherwise, the flow proceeds to step S2106.

(FIG. 21: Step S2105: Supplement)

Although the non-decompression volume 132 is created when backup is implemented, since it is made redundant when the backup is completed, it could be configured to be deleted at appropriate timing. Therefore, it is checked whether the non-decompression volume 132 is present when the restoration is implemented.

(FIG. 21: Steps S2106 and S2107)

These steps are similar to steps S2006 and S2007 in FIG. 20.

(FIG. 21: Step S2108)

The restoration program 462 updates the backup volume management table 464 based on content in steps S2106 and S2107.

(FIG. 21: Step S2109)

The restoration program 462 defines the non-decompression volume 132 as a restoration target volume.

(FIG. 21: Step S2110)

The restoration program 462 decides whether the restoration target data is compressed by the backup computer 200. If it is compressed, the flow proceeds to step S2111, and, otherwise, the flow skips to step S2112.

(FIG. 21: Step S2111)

The restoration program 462 instructs the backup computer 200 to decompress the compressed restoration target data. The backup computer 200 decompresses the restoration target data according to the instruction.

(FIG. 21: Step S2112)

The restoration program 462, if the restoration target data is compressed in the storage apparatus 100, instructs the backup computer 200 to restore the restoration target data into the non-decompression volume 132 of the storage apparatus 100. The restoration program 462, if the restoration target data is not compressed in the storage apparatus 100, instructs the backup computer 200 to restore the restoration target data to the decompression volume 131. The backup computer 200 implements restoration according to the instruction.

Example 1

Summary

As described above, when transmitting/receiving backup target data or restoration target data to/from the backup computer 200, the storage apparatus 100 according to Example 1 transmits/receives compressed data as is via the non-decompression volume 132. By this means, it is possible to reduce the data transfer amount at the timing of implementation of backup/restoration and speed up the data transfer.

Also, in Example 1, since the substitute of the non-decompression volume 132 created for backup/restoration is a logical volume present in the compression pool 110, it is not necessary to consume a new memory area to create the non-decompression volume 132.

Example 2

In Example 2 of the present invention, a configuration example will be explained where any of memory areas (i.e. volumes) held in the storage apparatus 100 is provided by an external storage apparatus 700. Other elements than the configuration according to the external storage apparatus 700 are substantially the same as in Example 1, and therefore different points will be mainly explained.

Figure 22:
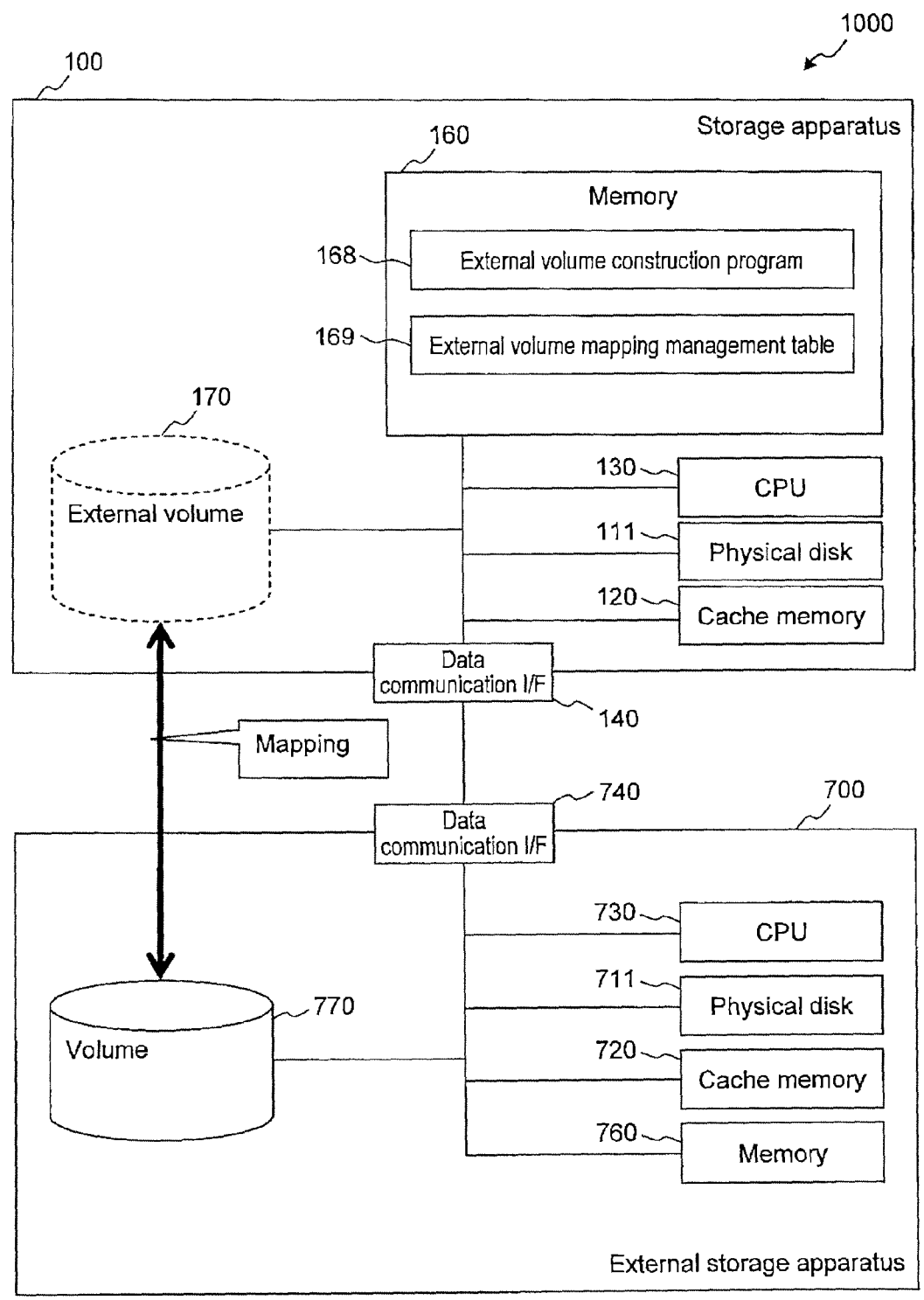
FIG. 22 is a configuration diagram of the computer system 1000 according to Example 2.

FIG. 22 is a configuration diagram of the computer system 1000 according to Example 2. Here, essential elements for explanation will be extracted and described. Any of memory areas (i.e. volumes) held in the storage apparatus 100 is configured as the external volume 170. The external volume 170 is a memory area in which the substitute is configured on a volume 770 of the external storage apparatus 700.

The external storage apparatus 700 has a physical disk 711, a cache memory 720, a CPU 730, a memory 760 and a volume 770. These functions are similar to each functional unit of the storage apparatus 100 but need not necessarily hold the same functions as the storage apparatus 100. That is, an essential requirement is that reference relationships are maintained between the volume 770 and the external volume 170 and data is transmitted or received between these storage apparatuses. In the following, for ease of explanation, it is presumed that each of the storage apparatus is able to create the decompression volume 131 and the non-decompression volume 132, and to read/write those volumes.

The storage apparatus 100 and the external storage apparatus 700 are connected via the data communication I/F 140, the data communication I/F 640 and the SAN 510, and can transmit or receive data through these.

The storage apparatus 100 has an external volume construction program 168 and an external volume mapping management table 169 in the memory 160, in addition to the configuration described in Example 1. The external volume construction program 168 is a program of constructing the external volume 170 and setting a correspondence relationship between a volume provided by the external storage apparatus 700 and the external volume 170. The external volume mapping management table 169 is a table to manage the correspondence relationship. The details will be explained in FIG. 24 described later.

Figure 23:
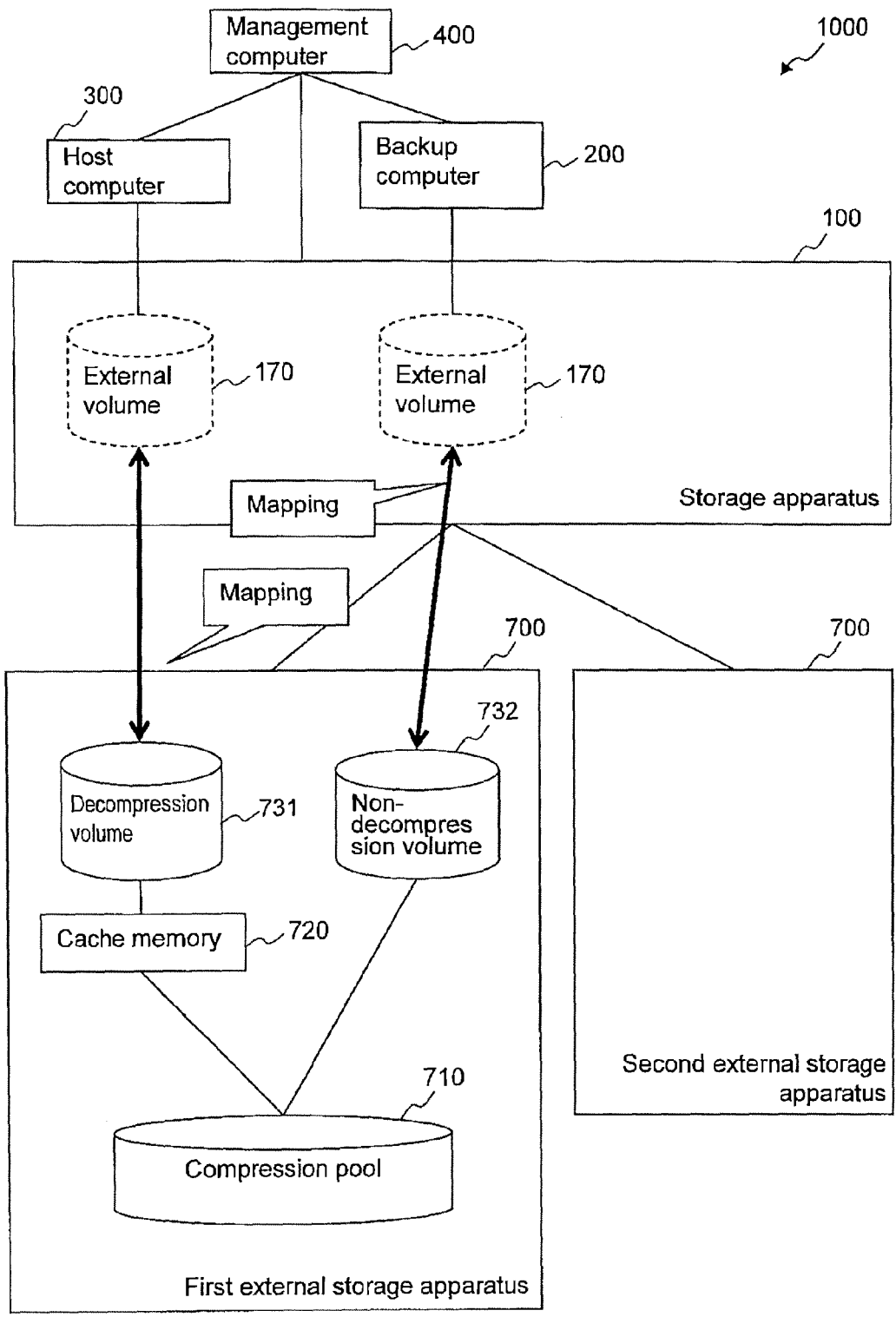
FIG. 23 is a diagram showing the connection relationship of each storage apparatus forming the computer system 1000 according to Example 2.

FIG. 23 is a diagram showing connection relationships between storage apparatuses forming the computer system 1000 according to Example 2. The number of the external storage apparatuses 700 is not necessarily limited to one, and it is possible to employ a configuration in which a plurality of external storage apparatuses 700 cooperate with the external volume 170.

In FIG. 23, a decompression volume 731 and non-decompression volume 732 held in a first external storage apparatus 700 are associated with respective external volumes 170. When each external volume 170 is accessed, the storage apparatus 100 transfers the access to the first external storage apparatus 700 and the first external storage apparatus 700 reads/writes data for a volume associated with the access.

FIG. 24 is a diagram showing a configuration of the external volume mapping management table 169. The external volume mapping management table 169 is a table to manage a correspondence relationship between a volume provided by the external storage apparatus 700 and the external volume 170, and has an external volume ID 1691, an external storage ID 1692, a volume ID 1693, an external volume LBA 1694 and a volume LBA 1695.

The external volume ID 1691 is the ID to uniquely identify the external volume 170 in the storage apparatus 100. When there are a plurality of external storage apparatuses 700, the external storage ID 1692 is the ID to identify each of the external storage apparatuses 700. The volume ID 1693 is the ID to uniquely identify a volume provided for the external volume 170 in the external storage apparatus 700. The external volume LBA 1694 is a logical block address in the external volume 170. The volume LBA 1695 is a logical block address in a volume provided by the external storage apparatus 700.

Figure 25:
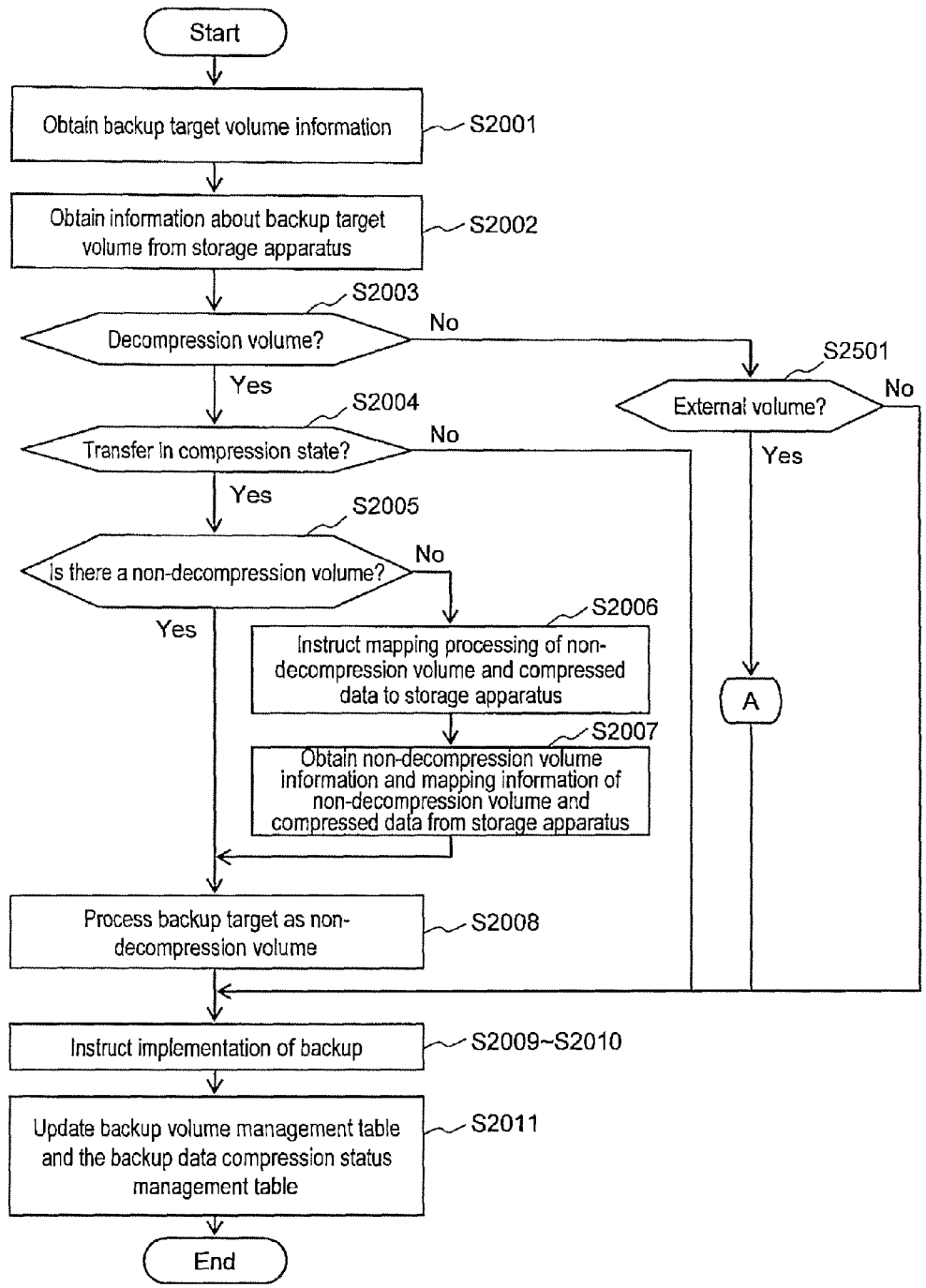
FIG. 25 is a flowchart for explaining operations of the backup program 461 according to Example 2.

FIG. 25 is a flowchart for illustrating operations of the backup program 461 in Example 2. The present flowchart differs from the flowchart explained in FIG. 20 in newly setting step S2501 as branch destination in step S2003. Other steps are the same as in FIG. 20. It should be noted that, for ease of description, steps S2009 and S2010 are described as one step.

(FIG. 25: Step S2501)

The backup program 461 decides whether a backup target volume is the external volume 170. If it is the external volume 170, the flow proceeds to point A described below, and, otherwise, the flow skips to step S2010.

Figure 26:
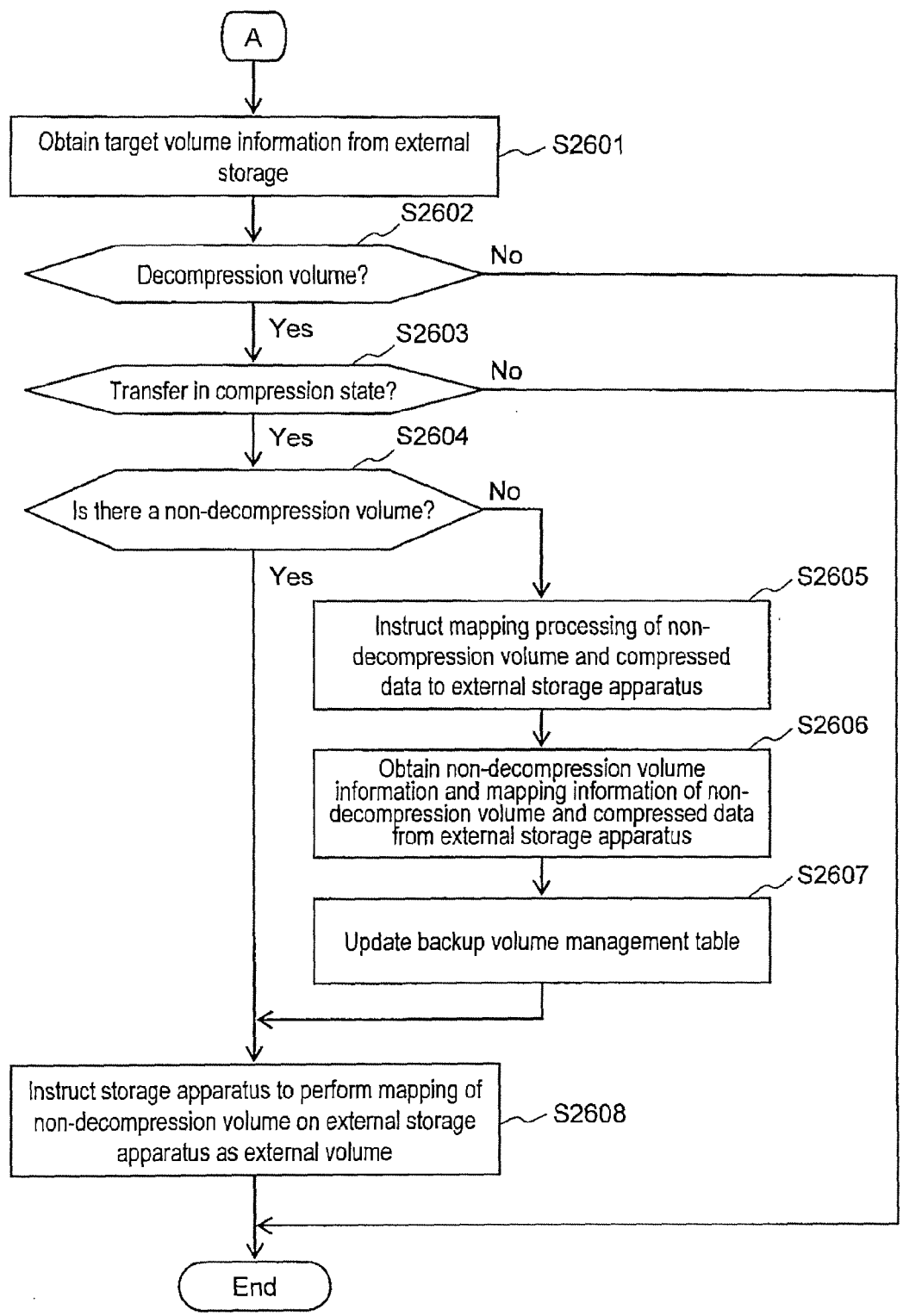
FIG. 26 is a flowchart for explaining processing in point A.

FIG. 26 is a flowchart for illustrating processing in point A. In the following, each step in FIG. 26 will be explained.

(FIG. 26: Step S2601)

The backup program 461 retrieves, from the external storage 700 associated with the external volume 170, information on a volume associated with the external volume 170 (S2601). The information includes a type of a volume targeted for backup.

(FIG. 26: Steps S2602 and S2607)

The backup program 461 gives an instruction to perform the same process as that of steps S2003 to S2007, S2011. This is equivalent to construction of the non-decompression volume 132 on the external storage apparatus 700, and is processing of providing the non-decompression volume 132 in the external storage apparatus 700 instead of the storage apparatus 100.

(FIG. 26: Step S2608)

The backup program 461 instructs the external volume construction program 168 stored in the storage apparatus 100 to associate the non-decompression volume 732 on the external storage apparatus 700 with the external volume 170. The external volume construction program 168 in the storage apparatus 100 updates the external volume mapping management table 169 according to the instruction.

Figure 27:
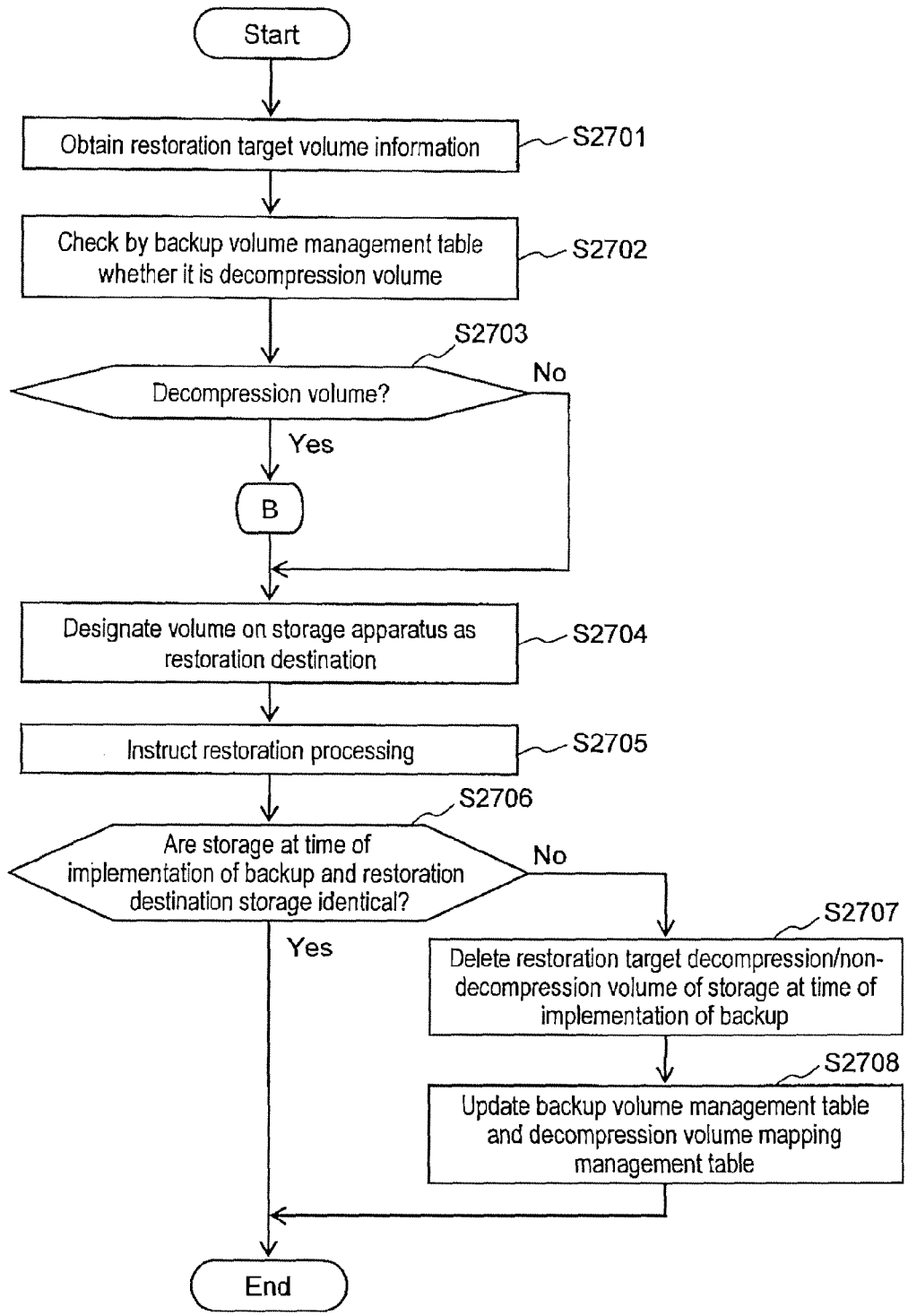
FIG. 27 is a flowchart for explaining operations of the restoration program 462 according to Example 2.

FIG. 27 is a flowchart for illustrating operations of the restoration program 462 in Example 2. In the following, each step in FIG. 27 will be explained.

(FIG. 27: Steps S2701 to S2703)

The restoration program 462 obtains an instruction as to which volume is processed as a restoration target (S2701). The restoration program 462 checks whether the restoration target volume is the decompression volume 131, from the backup volume management table 464 (S2702). If it is the decompression volume 131, the flow proceeds to point B, and, otherwise, the flow skips to step S2704 (S2703).

(FIG. 27: Steps S2704 and S2705)

The restoration program 462 designates a volume on the storage apparatus 100 as restoration destination (S2704). The restoration program 462 instructs the backup computer 200 to restore the restoration target data for the storage apparatus 100. The backup computer 200 implements restoration according to the instruction (S2705).

(FIG. 27: Step S2706)

The restoration program 462 decides whether a backup target storage apparatus at the time of backup implemented in advance and the restoration destination storage apparatus are the same. If they are the same, the flowchart is terminated, and, otherwise, the flow proceeds to step S2707.

(FIG. 27: Steps S2707 and S2708)

Steps S2707 and S2708 are performed if the decompression volume 131 and the non-decompression volume 132 that are created in this flow chart as restoration targets will be handled from the host computer 200 and the backup computer 200 as the same volumes as the decompression volume 131 and the non-decompression volume 132 targeted for backup or each of the external volume 170 mapping the decompression volume 731 and the non-decompression volume 732 on the external storage apparatus 700. On the backup target storage apparatus at the time of the backup implemented in advance, the restoration program 462 gives an instruction to delete the decompression volume 131 and the non-decompression volume 132 targeted for backup or the decompression volume 731 and the non-decompression volume 732 and each of the external volume 170 mapping those volumes. After that, the restoration program 462 changes the LUN of the decompression volume 131 selected as restoration target into the LUN of the deleted decompression volume 131 or the external volume 170, and changes the LUN of the decompression volume 131 selected as restoration target into the LUN of the deleted non-decompression volume 132 or the external volume 170 (S2707). The restoration program 462 reflects the result in step S2707 to the backup volume management table 464 and the decompression volume mapping management table 465 (S2708). Steps S2707 and S2708 are not performed if the restoration is performed into a volume that is not the same as the decompression volume 131 targeted for backup.

Figure 28:
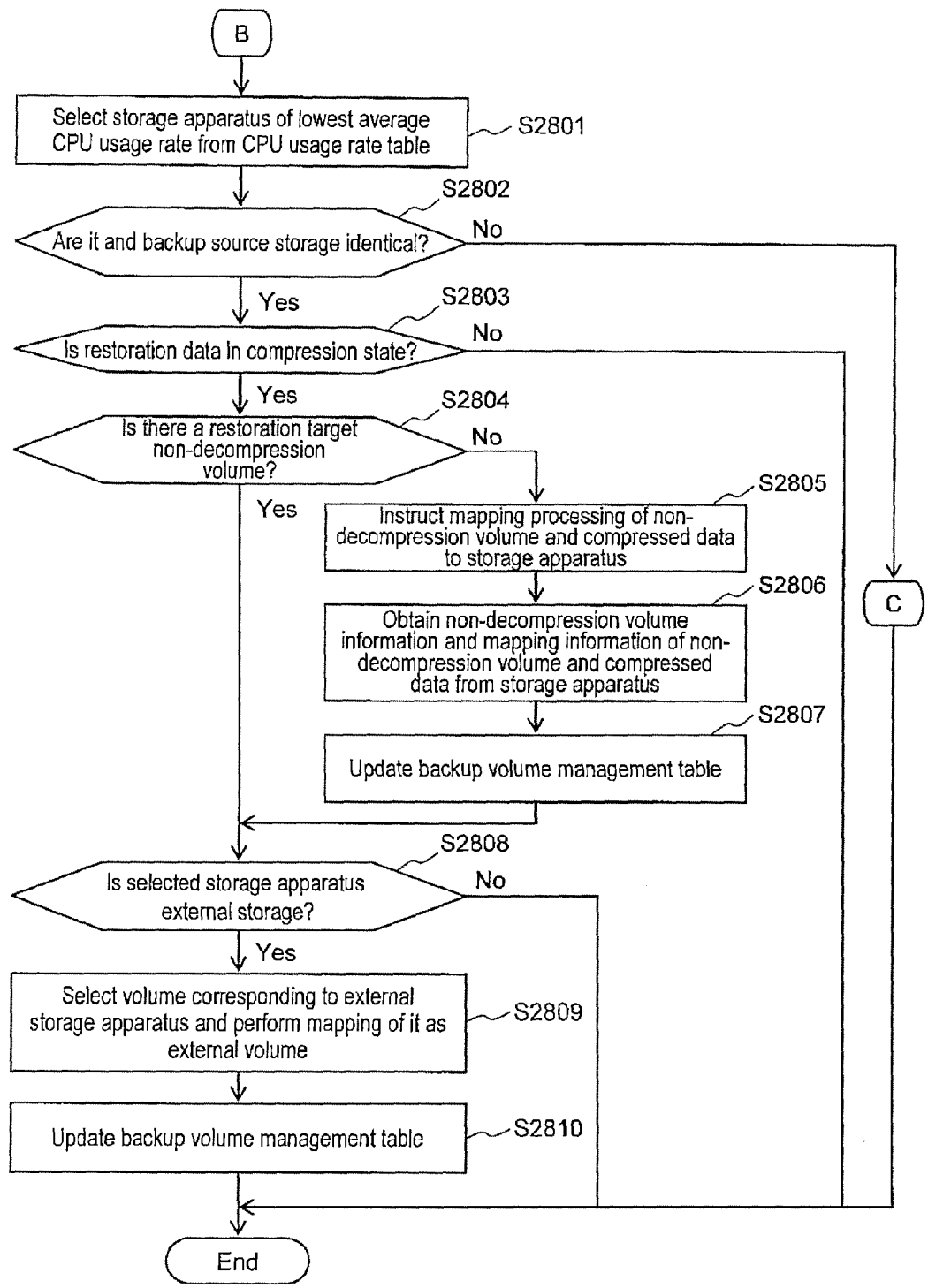
FIG. 28 is a flowchart for explaining processing in point B.

FIG. 28 is a flowchart for illustrating processing in point B. In the following, each step in FIG. 28 will be explained.

(FIG. 28: Step S2801)

The restoration program 462 selects a storage apparatus that is targeted for restoration. At this time, the backup-source storage apparatus can be preferentially selected, or a storage apparatus can be preferentially selected on the basis of average CPU usage rate or disk usage rate. Any approach for selecting a storage apparatus can be employed. Hereinafter, an example will be provided where a storage apparatus in which the average CPU usage rate 4662 is the lowest is selected, based on the CPU usage rate table 466. The storage apparatus selected in this step is not necessarily the external storage apparatus 700.

(FIG. 28: Step S2802)

The restoration program 462 decides whether the storage apparatus selected in step S2801 is the same as a backup source storage apparatus at the time of backup implemented in advance. If they are the same, the flow proceeds to step S2803, and, otherwise, the flow proceeds to point C.

(FIG. 28: Steps S2803 to S2807)

The restoration program 462 implements the same processing as in steps S2104 to S2108 in FIG. 21 for the storage apparatus selected in step S2801.

(FIG. 28: Step S2808)

The restoration program 462 decides whether the storage apparatus selected in step S2801 is the external storage apparatus 700. If it is the external storage apparatus 700, the flow proceeds to step S2809, and, otherwise, the present flowchart is terminated.

(FIG. 28: Steps S2809 and S2810)

The restoration program 462 selects a volume corresponding to the (external) storage apparatus selected in step S2801 and associates this as the external volume 170 (S2809). The restoration program 462 reflects the correspondence relationship to the backup volume management table 464 (S2810).

Figure 29:
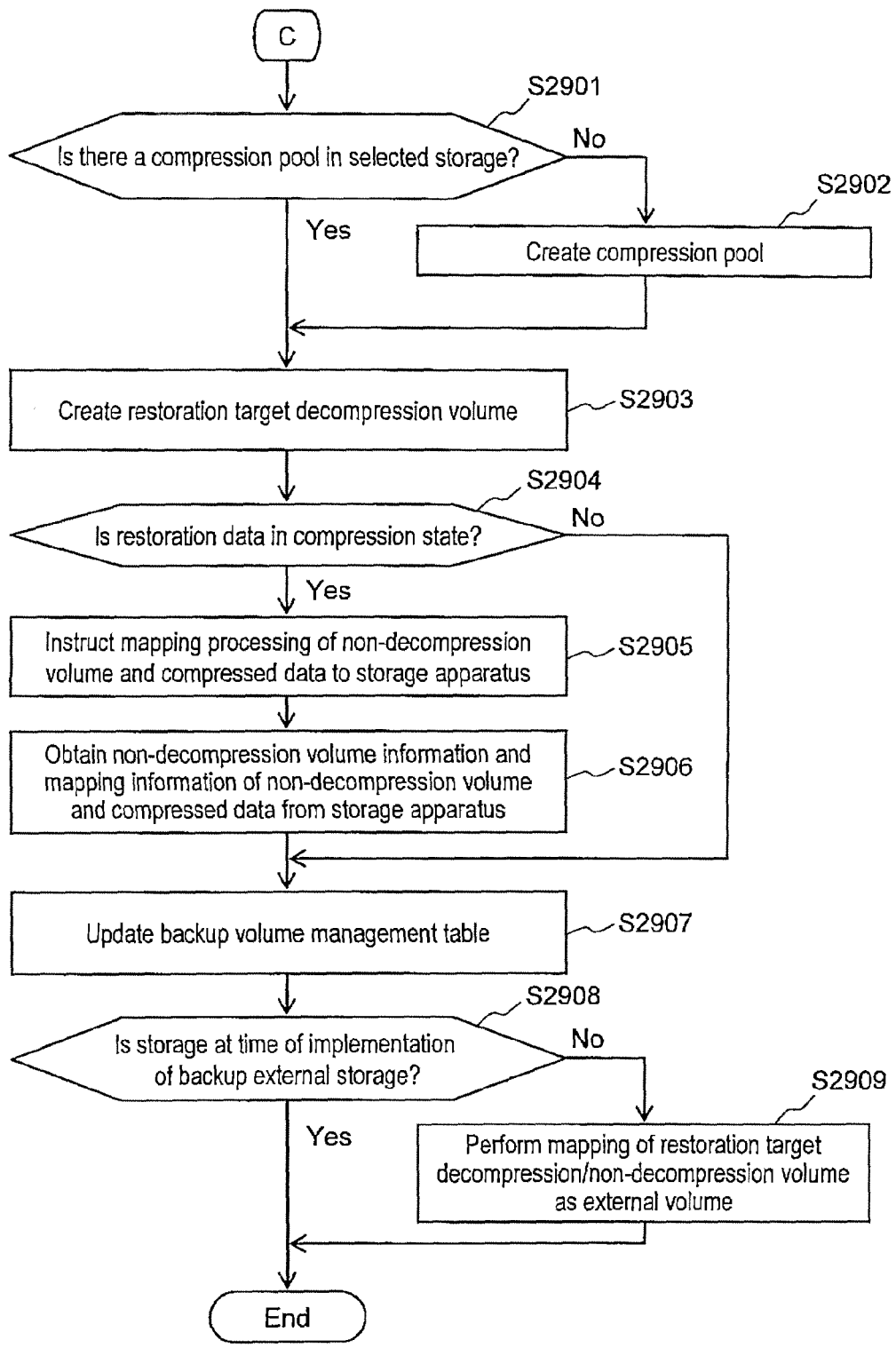
FIG. 29 is a flowchart for explaining processing in point C.

FIG. 29 is a flowchart for illustrating processing in point C. In the following, each step in FIG. 29 will be explained.

(FIG. 29: Steps S2901 and S2902)

The restoration program 462 decides whether there is a compression pool on the storage apparatus selected in step S2801 (S2901). If it is present, the flow skips to step S2903, and, otherwise, it is newly created (S2902).

(FIG. 29: Step S2903)

The restoration program 462 newly creates a restoration destination decompression volume of restoration target data on the storage apparatus selected in step S2801.

(FIG. 29: Step S2904)

The restoration program 462 decides whether the restoration target data is compressed. If it is compressed, the flow proceeds to step S2905, and, otherwise, the flow skips to step S2907.

(FIG. 29: Steps S2905 to S2907)

The restoration program 462 implements the same processing as in steps S2106 to S2108 for the storage apparatus selected in step S2801.

(FIG. 29: Steps S2908 and S2909)

The restoration program 462 decides whether the backup target storage apparatus at the time of backup implemented in advance is the external storage apparatus 700 (S2908). If it is the external storage apparatus, the present flowchart is terminated, and, otherwise, the same processing as in S2707 is implemented.

Example 2

Summary

As described above, the storage apparatus 100 according to Example 2 can provide the same advantage as in Example 1 even in a case where any of the compression pool 110, the decompression volume 131, the non-decompression volume 132 is formed on the external storage apparatus 700.

Also, the storage apparatus 100 according to Example 2 can implement restoration for a storage apparatus of the lowest CPU load in a case where there are a plurality of storage apparatuses including the external storage apparatus 700 in the computer system 1000. In a case where there is no non-decompression volume on the restoration destination storage apparatus, it can be newly created. By this means, it is possible to ease an influence due to degradation of the processing performance of a storage apparatus upon restoration processing.

Although a CPU load is exemplified in Example 2, it may be possible to prioritize a storage apparatus in which other load indices such as a physical disk I/O load are lower.

The present invention is not limited to the above examples and includes many variation examples. The above examples have been explained in detail for ease of understanding of the present invention and are not necessarily limited to a configuration having all components described above. Also, it is possible to replace part of the configuration of one example with the configuration of the other example. Also, it is possible to add the configuration of one example to the configuration of the other example. Also, regarding part of the configuration of one example, it is possible to add, remove or replace the other configuration.

The above configurations, functions, processing units and processing means may be realized with hardware by, for example, designing part or all of them with integrated circuits. Also, the above configurations and functions may be realized with software by interpreting and executing a program of realizing their functions in a processor. Information about programs, tables and files to realize the functions can be stored in a recording apparatus such as a memory, hard disk and SSD (Solid State Drive), and a storage medium such as an IC card, SD card and DVD.

REFERENCE SIGNS LIST 100 storage apparatus
110 compression pool
111 physical disk
120 cache memory
130 CPU
131 decompression volume
132 non-decompression volume
140 data communication I/F
150 management I/F
160 memory
161 non-decompression volume generation program
162 volume read program
163 volume write program
164 decompression volume management table
165 non-decompression volume management table
166 compression data arrangement management table
167 volume type management table
200 backup computer
210 physical disk
220 input/output apparatus
230 CPU
240 data communication I/F
250 management I/F
260 memory
261 tape library operation program
262 tape backup data management table
300 host computer
310 physical disk
320 input/output apparatus
330 CPU
340 data communication I/F
350 management I/F
360 memory
400 management computer
410 physical disk 420 input/output apparatus
430 CPU
450 management OF
460 memory
461 backup program
462 restoration program
463 CPU usage rate monitoring program
464 backup volume management table
465 decompression volume mapping management table
466 CPU usage rate table
467 backup data compression status management table
510 SAN
520 LAN
600 tape library apparatus
610 tape medium
630 CPU
640 data communication I/F
650 management I/F
660 memory
661 tape medium control program
662 backup data compression program
700 external storage apparatus
710 compression pool
711 physical disk
720 cache memory
730 CPU
731 decompression volume
732 non-decompression volume
760 memory
770 volume
1000 computer system

The invention claimed is:

1. A computer system comprising a management apparatus and a storage apparatus; wherein:
the storage apparatus comprises a plurality of storage devices and a processor;
the processor:
provides a first virtual volume and a second virtual volume both referring to the same pool area;
compresses first write data to the first virtual volume and stores it in the pool area that is referred to by the first virtual volume to which the first write data is written;
upon receiving a read request to the first virtual volume, decompresses the compressed data stored in the pool area referred to by the first virtual volume to which the read request is directed, and responds the decompressed data;
the management apparatus, if a backup of the first virtual volume is performed without decompression, instructs a backup computer connected with the management apparatus to perform a backup with the second virtual volume as the backup target; and
the processor, responding to reading out of the second virtual volume from the backup computer, forwards the compressed data read out from the pool area associated with the second virtual volume without decompression.

2. The computer system according to claim 1, wherein:
the management apparatus, if a third volume storing uncompressed data is targeted for backup, instructs the backup computer to compress the backup target data stored in the second virtual volume and stores it in the second virtual volume.

3. The computer system according to claim 1, wherein:
the management apparatus, when providing the instruction of backup, instructs the storage apparatus to create the second virtual volume if the second virtual volume does not exist in the storage apparatus; and
the processor creates, as the second virtual volume, a virtual volume that has a capacity equal to or greater than the data size stored in the pool area referred to by the first virtual volume.

4. The computer system according to claim 2, wherein:
the management apparatus, when restoring compressed data stored in the backup computer into the first virtual volume, instructs the backup computer to restore with the second virtual volume as a restoration destination; and
the processor, according to the request from the backup computer, stores the restore data into the pool area referred to by the second virtual volume without decompression.

5. The computer system according to claim 1, further comprising a first storage apparatus connected with the storage apparatus, wherein:
the pool area, the first virtual volume, and the second virtual volume are included in the first storage apparatus; and
the storage apparatus provides a virtual volume associated with the first virtual volume and a virtual volume associated with the second virtual volume.

6. The computer system according to claim 5, wherein:
the management apparatus, if the backup-target volume is a virtual volume associated with the first virtual volume provided by the first storage apparatus, retrieves information on the first virtual volume and the second virtual volume provided by the first storage apparatus, and instructs the backup computer to perform a backup for the second virtual volume.

7. The computer system according to claim 5, wherein:
the management apparatus:
selects a storage apparatus as the restoration target among the storage apparatus and the first storage apparatus; and
instructs, lithe second virtual volume does not exist in the selected storage apparatus, the selected storage apparatus to create the second virtual volume.

* * * * *